(12) United States Patent
Nakahara

(10) Patent No.: US 10,891,970 B2
(45) Date of Patent: Jan. 12, 2021

(54) SOUND SOURCE DETECTING METHOD AND DETECTING DEVICE

(71) Applicant: ONFUTURE LTD., Tokyo (JP)

(72) Inventor: Masataka Nakahara, Tokyo (JP)

(73) Assignee: ONFUTURE LTD., Tokyo (JP)

( * ) Notice: Subject to any disclaimer, the term of this patent is extended or adjusted under 35 U.S.C. 154(b) by 0 days.

(21) Appl. No.: 16/487,309

(22) PCT Filed: Feb. 9, 2018

(86) PCT No.: PCT/JP2018/004565
§ 371 (c)(1),
(2) Date: Aug. 20, 2019

(87) PCT Pub. No.: WO2018/155231
PCT Pub. Date: Aug. 30, 2018

(65) Prior Publication Data
US 2020/0176015 A1    Jun. 4, 2020

(30) Foreign Application Priority Data

Feb. 21, 2017    (JP) ................... 2017-029916

(51) Int. Cl.
*H04R 29/00*    (2006.01)
*G10L 25/51*    (2013.01)
(Continued)

(52) U.S. Cl.
CPC ............ *G10L 25/51* (2013.01); *G01S 5/18* (2013.01); *G10L 25/03* (2013.01)

(58) Field of Classification Search
CPC ......... G10L 25/00; G10L 25/03; G10L 25/18; G10L 25/21; G10L 25/24; G10L 25/48;
(Continued)

(56) References Cited

U.S. PATENT DOCUMENTS 4,122,910 A * 10/1978 Wehner ............... H04R 5/02
181/144
9,651,649 B1 * 5/2017 Salloum ................ G01S 3/802
(Continued)

FOREIGN PATENT DOCUMENTS

JP    7-209069 A    8/1995
JP    2017-151216 A    8/2017

OTHER PUBLICATIONS

Guy et al., "A Measurement System and Method to Investigate the Directional Characteristics of Sound Fields in Enclosures," Noise Control Engineering Journal, vol. 42, No. 1, Jan.-Feb. 1994, pp. 8-18 (13 pages total).

(Continued)

*Primary Examiner* — Leshui Zhang
(74) *Attorney, Agent, or Firm* — Birch, Stewart, Kolasch & Birch, LLP

(57) ABSTRACT

Provided are a detection method for a sound source and a detection device therefor, which are capable of accurately detecting the position of a sound source through use of measurement results of sound intensities. In the detection method, $I_{all}=\sqrt{(I_x^2+I_y^2+I_z^2)}$, which is a total value of the sound intensities $I_x$, $I_y$, and $I_z$ in three axial directions (x-, y-, and z-axis directions) orthogonal to each other at a sound receiving point (P) in a sound field, is calculated, and then the position of the sound source is estimated after extracting the sound source by performing processing with averaged values within a predetermined peak width instead of the magnitude of a peak in a sound intensity waveform of the total value, or the position of the sound source is estimated after extracting the sound source with attention being given to a spatial travel speed of a sound intensity or a sound particle velocity of the total value.

4 Claims, 21 Drawing Sheets

(51) Int. Cl.
*G01S 5/18* (2006.01)
*G10L 25/03* (2013.01)

(58) Field of Classification Search
CPC ......... G10L 25/51; G10L 25/54; G10L 25/60;
G10L 25/69; G01S 5/18; G01S 5/20;
G01S 5/22; G01S 5/24; G01S 5/26; G01S
5/28; G01S 5/30; H04R 29/00; H04R
29/001; H04R 29/002; H04R 29/003;
H04R 29/004; H04R 29/005; H04R
29/006; H04R 29/007; H04R 29/008;
H04R 5/02; H04R 5/04; H04R 5/00;
H04R 5/027; H04R 3/002; H04R 3/008;
H04R 3/12; H04R 3/14; H04R 2420/01;
H04R 2420/03; H04R 2420/05; H04R
1/00; H04R 1/26; H04R 1/403; H04R
2201/401; H04R 2203/12; H04R
2205/022; H04R 2205/024; H04R
2430/20; H03G 7/00; H04S 1/00; H04S
1/002; H04S 5/02; H04S 3/00; H04S
3/002; H04S 3/004; H04S 3/008; H04S
7/00; H04S 7/301; H04S 7/302; H04S
2420/01; H04S 2420/03; H04S 2400/01;
H04S 2400/15; Y10T 307/598; Y10T
307/812; G10K 15/04
USPC .... 381/56, 58, 59, 66, 313, 320, 91, 92, 95,
381/111, 112, 113, 114, 115, 119, 122;
700/94
See application file for complete search history.

(56) References Cited

U.S. PATENT DOCUMENTS

| | | | | |
|---|---|---|---|---|
| 10,088,868 | B1* | 10/2018 | Hernandez Garcia | G06F 1/163 |
| 2002/0167862 | A1* | 11/2002 | Tomasi | G06F 3/0433 367/118 |
| 2004/0032796 | A1* | 2/2004 | Chu | H04N 7/142 367/123 |
| 2006/0098534 | A1* | 5/2006 | Hickling | G01S 5/20 367/124 |
| 2006/0239471 | A1* | 10/2006 | Mao | H04R 1/406 381/92 |
| 2006/0245601 | A1* | 11/2006 | Michaud | H04R 3/005 381/92 |
| 2007/0172078 | A1* | 7/2007 | Beguet | G03H 3/00 381/92 |
| 2009/0074202 | A1* | 3/2009 | Chen | H04R 1/406 381/92 |
| 2009/0310802 | A1* | 12/2009 | Zhang | H04S 7/302 381/300 |
| 2010/0316231 | A1* | 12/2010 | Williams | H04R 3/005 381/92 |
| 2011/0110531 | A1* | 5/2011 | Klefenz | H04R 3/005 381/92 |
| 2012/0026837 | A1* | 2/2012 | Li | G01S 3/8086 367/127 |
| 2012/0195436 | A1* | 8/2012 | Nakadai | H04R 3/005 381/56 |
| 2012/0288114 | A1* | 11/2012 | Duraiswami | H04R 3/005 381/92 |
| 2012/0328108 | A1* | 12/2012 | Enamito | H04S 7/302 381/17 |
| 2013/0022206 | A1* | 1/2013 | Thiergart | G10L 19/025 381/17 |
| 2013/0129124 | A1* | 5/2013 | Westermann | H04R 25/505 381/312 |
| 2013/0230179 | A1* | 9/2013 | Beaty | H04R 29/00 381/56 |
| 2013/0268281 | A1* | 10/2013 | Walther | G10L 19/02 704/500 |
| 2013/0336490 | A1* | 12/2013 | Someda | H04R 5/00 381/17 |
| 2015/0086023 | A1* | 3/2015 | Enamito | H04S 7/302 381/17 |
| 2016/0142830 | A1* | 5/2016 | Hu | G10L 21/14 434/185 |
| 2016/0161594 | A1* | 6/2016 | Benattar | H04R 1/1083 367/107 |
| 2016/0165339 | A1* | 6/2016 | Benattar | H04R 1/406 381/92 |
| 2016/0165341 | A1* | 6/2016 | Benattar | G01S 3/801 381/92 |
| 2017/0347217 | A1* | 11/2017 | McGibney | H04R 29/005 |
| 2018/0306890 | A1* | 10/2018 | Vatcher | G01S 3/86 |

OTHER PUBLICATIONS

International Preliminary Report on Patentability and Written Opinion of the International Searching Authority, dated Sep. 6, 2019, for International Application No. PCT/JP2018/004565, with a Written Opinion translation.
Nakahara et al., "Development of an Acoustic Design Support Tool VSV4 for Measuring, Analyzing, and Visualizing Sound Intensities," Lecture proceedings CD-ROM of 2016 Autumn meeting of the Acoustical Society of Japan, Sep. 16, 2016, pp. 933-936 (9 pages), with a partial translation.
Nakahara et al., "A Study on Means for Extracting and Visualizing Sound Source Information from Sound Intensities," Lecture proceedings CD-ROM [CD-ROM] of 2017 spring meeting of the Acoustical Society of Japan, Mar. 17, 2017, pp. 869-872 (5 pages total), with a statement of relevance.evance.
Sekiguchi et al., "Analysis of Sound Field on Spatial Information Using a Four-Channel Microphone System Based on Regular Tetrahedron Peak Point Method," Applied Acoustics, vol. 37, 1992, pp. 305-323 (21 pages total).
Yamasaki et al., "Measurement of Spatial Information in Sound Fields by Closely Located Four Point Microphone Method," J. Acoust. Soc. Jpn. E, vol. 10, No. 2, 1989 pp. 101-110.

* cited by examiner (a) Musikverein's concert hall, Vienna    (b) Munich Philharmonie (Y Yamasaki, K. Sekiguchi et al.)

SOUND SOURCE DETECTING METHOD AND DETECTING DEVICE

TECHNICAL FIELD

The present invention relates to a detection method for a sound source and a detection device therefor, and more particularly, to a detection method for a sound source and a detection device therefor that use measurement results of sound intensities.

BACKGROUND ART

As methods of measuring the behavior of sound in a three-dimensional space, there are known methods exemplified as follows.

One of the exemplified methods is a method 1 (see FIG. 15 of Non Patent Literature 1), in which sound intensities in three orthogonal axial directions (x-, y-, and z-axis directions) are measured, and measurement results thereof are used to analyze, for example, reflected sounds (hereinafter referred to as "reflections") in a concert hall so as to identify what kind of sound has arrived from which direction at which timing.

The exemplified methods also include a method 2 (see FIG. 16 of Non Patent Literature 2) and a method 3 (see FIG. 17 of Non Patent Literature 3), in each of which sound pressures are measured in place of the sound intensities to analyze, for example, reflections in the concert hall.

The method 1, in which the measurement results of the sound intensities are used, is advantageous in that the measurement accuracy is high. The methods 2 and 3 are also advantageous in being easy to understand because useful sound source information, that is, sound sources that have caused reflection, which are so-called virtual sources (indicated by the symbols "○" in FIG. 16 and FIG. 17), are extracted.

From the above description, for example, it is likely that useful sound source information can be analyzed with high accuracy when the method 2 or 3 or other such method of extracting reflections (virtual sources) can be applied to the results of measuring the sound intensities obtained by the method 1.

Incidentally, a basic idea on the extraction of a virtual source in the methods 2 and 3 is that information on the peaks in sound pressure waveforms measured by microphones is used to determine the presence of a sound source and estimate its coordinates.

Specifically, as exemplified in FIG. 18, when two sound sources $S_1$ and $S_2$ located at different positions in an x-y plane space (z=0) are subjected to measurement by three microphones P1 to P3 installed at different positions near a measurement point (origin) 0, the measured sound pressure waveforms have timings and amplitudes different from each other. Therefore, the peaks in the respective sound pressure waveforms obtained by the microphones P to P3 are detected, to thereby determine the presence of the sound sources and estimate the coordinates of the sound sources from combinations of peak levels and time differences in the respective sound pressure waveforms.

In view of the foregoing, the inventor of the present invention newly devised a method 4 of applying a method of "peak detection", which can be called an extraction method for a sound source in the methods 2 and 3, to a sound source analysis method using the measurement results of sound intensities in the method 1, and examined the usability of the method 4. In this case, the devised method of extracting sound source information (position of a sound source) is referred to as "method 4" of detecting the sound source information from the sound intensities through use of the "peak detection".

The method 4 of detecting the sound source information from the sound intensities through use of this "peak detection" employs a configuration in which the processing steps of "measurement of sound intensities", "extraction of a sound source", and "estimation of sound source coordinates", which are described below, are performed in the stated order.

Measurement of Sound Intensities (1) Sound intensities $I_x$, $I_y$, and $I_z$ (unit: W/m$^2$) in the three axial directions (x, y, and z) orthogonal to each other at a sound receiving point are measured.

(2) $I_{all}=\sqrt{(I_x^2+I_y^2+I_z^2)}$ which is a total value of the sound intensities $I_x$, $I_y$, and $I_z$ (where $\sqrt{(\ )}$ represents the square root of the value in the parentheses; the same applies hereinafter), is calculated.

<Extraction of Sound Source>

(3) It is assumed that the peak in the waveform of the sound intensity of the above-mentioned total value indicates a sound source.

(4) The peak of the above-mentioned total value is extracted for each time window $\Delta t$ (s).

(5) The level of the sound source and a distance from the sound source are calculated from the peak extracted in the step (4).

<Estimation of Sound Source Coordinates>

(6) The peaks in the sound intensities $I_x$, $I_y$, and $I_z$ corresponding to the peak extracted in the step (4) are extracted for each time window $\Delta t$ (s).

(7) The coordinates of the sound source are estimated from the signed magnitudes of the peaks in the sound intensities $I_x$, $I_y$, and $I_z$ and the distance from the sound source calculated in the step (5).

FIG. 19 is an illustration of a concept of the detection method 4 and an example of results obtained in the respective steps. In FIG. 19, a symbol P represents the sound receiving point, a symbol $S_1$ represents a real source indicating an actual sound source, and symbols $S_2$ to $S_7$ each represent a virtual source representing a reflection.

The steps (1) to (5) are described later in detail with reference to embodiments described later.

The coordinates of the sound source are estimated in the step (7) as a spot spaced apart along a direction ($\pm |I_{px}\pm|$, $\pm |I_{py}|$, $\pm |I_{pz}|$) from the origin 0, which is expressed by the signed magnitudes $\pm |I_{px}|$, $\pm |I_{py}|$, and $\pm |I_{pz}|$ of the peaks extracted from $I_x$, $I_y$, and $I_z$ by a distance given by the peak of the total value $I_{all}$ calculated in the step (5).

An example of results obtained when the detection method 4 is put to trial is illustrated in FIG. 20.

In this example of the results, the real source $S_1$ is set as a target to be estimated so as to be arranged on the y-axis (at a position that satisfies x=0 and z=0) as illustrated in FIG. 20. Therefore, the sound intensities $I_x$ and $I_z$ in the x direction and the z direction at this time are originally assumed to satisfy $I_x=0$ and $I_z=0$.

However, in the results of the measurement, some residual waveforms are found in the sound intensities $I_x$ and $I_z$.

Therefore, in the detection method 4 using this "peak detection", the peaks of those residual waveforms are erroneously recognized as the coordinates in the x direction and the z direction. As a result, as illustrated in FIG. 20, the detected (estimated) position (black circle) of the sound source $S_1$ is finally estimated to be located in a place deviating from a correct position (white circle) of the real source $S_1$ supposed to be located on the y-axis. There is no other way but to state that such results have low estimation accuracy of a sound source position.

This detection deviation of the sound source position in the detection method 4 can be considered to result from a contradiction caused by applying the method for the peak detection, which has been developed for the sound pressure waveform in the methods 2 and 3, to the waveforms of the sound intensities.

That is, the sound intensity is a physical quantity generally indicating what level of sound has arrived from which direction. Therefore, for example, when the two sound sources $S_1$ and $S_2$ are arranged at respective positions (in particular, the sound source $S_2$ is arranged at a position on the y-axis) in an x-y plane space (z=0) as illustrated in FIG. 21, the sound intensity $I_x$ of a sound that has arrived at the origin 0 from the sound source $S_2$ in terms of the x direction satisfies $I_x=0$, and there is no peak information. As described above, the coordinates of the sound source sometimes fail to be obtained in an attempt to detect the position of the sound source from the peak information on waveforms of the sound intensities.

Therefore, it is understood that, in the analysis targeting the sound intensities, the positions of some sound sources cannot have the sound source information (positions) obtained from the peak information on their waveforms.

CITATION LIST

Non Patent Literature

[NPL 1] R. W. Guy and A. Abdou, "A measurement system and method to investigate the directional characteristics of sound fields in enclosures," Noise Control Engineering Journal, 41, 8-18 (1994).

[NPL 2] Y. Yamasaki and T. Itou, "Measurement of spatial information in sound field by closely located four point microphone method," Journal of the Acoustical Society of Japan. (E), 10, 101-110 (1989).

[NPL 3] K. Sekiguchi, S. Kimura and T. Hanyu, "Analysis of sound field on spatial information using a four-channel microphone system based on regular tetrahedron peak method," Applied Acoustics, 37, 305-323 (1992).

SUMMARY OF INVENTION

Technical Problem

The present invention provides a detection method for a sound source and a detection device therefor, which are capable of accurately detecting the position of a sound source through use of measurement results of sound intensities.

Solution to Problem

According to the invention (1), there is provided a detection method for a sound source, the detection method including: a measurement step for sound intensities, of measuring sound intensities $I_x$, $I_y$, and $I_z$ (W/m$^2$) in three axial directions (x, y, and z) orthogonal to each other at a sound receiving point in a sound field, and calculating a total value of the sound intensities $I_x$, $I_y$, and $I_z$ as $I_{all}=\sqrt{(I_x^2+I_y^2+I_z^2)}$; a first extraction step for a sound source, of extracting a peak in a sound intensity waveform of the total value obtained in the measurement step for each time window while assuming that the peak indicates a sound source, and calculating a level of the sound source and a distance from the sound source from the extracted peak; and a first estimation step for sound source coordinates, of estimating a peak width of the total value obtained in the measurement step, calculating signed averaged values of magnitudes within peak widths in the sound intensities $I_x$, $I_y$, and $I_z$ corresponding to the peak width, and estimating coordinates of the sound source from the signed averaged values within the peak widths in the sound intensities $I_x$, $I_y$, and $I_z$ and the distance from the sound source obtained in the first extraction step.

Further, according to the invention (2), there is provided a detection method for a sound source, the detection method including: a measurement step for sound intensities, of measuring sound intensities $I_x$, $I_y$, and $I_z$ (W/m$^2$) in three axial directions (x, y, and z) orthogonal to each other at a sound receiving point in a sound field, and calculating a total value of the sound intensities $I_x$, $I_y$, and $I_z$ as $I_{all}=\sqrt{(I_x^2+I_y^2+I_z^2)}$; a second extraction step for a sound source, of: setting a threshold value of a spatial travel speed for distinguishing a sound intensity of the total value obtained in the measurement step between a source intensity component and a drifting intensity component; cutting out, from the sound intensity of the total value, the source intensity component exhibiting a spatial travel speed equal to or lower than the threshold value, or cutting out, from the sound intensity of the total value, the source intensity component corresponding to an arrival time of a sound particle velocity exhibiting a spatial travel speed equal to or lower than the threshold value based on a total value of sound particle velocities obtained by dividing the sound intensity of the total value by a sound pressure; and calculating averaged values of a strength and an arrival time of the cut-out source intensity component included as a piece to set a level of a sound source and a distance from the sound source; and a second estimation step for sound source coordinates, of cutting out the sound intensities $I_x$, $I_y$, and $I_z$ included in the same time width as the piece being the source intensity component cut out in the second extraction step, calculating averaged values of signed magnitudes of the cut-out sound intensities $I_x$, $I_y$, and $I_z$, and estimating coordinates of the sound source from signed averaged values of the sound intensities $I_x$, $I_y$, and $I_z$ and the distance from the sound source obtained in the second extraction step.

Meanwhile, according to the invention (3), there is provided a detection device for a sound source, the detection device including: measurement means for sound intensities, for measuring sound intensities $I_x$, $I_y$, and $I_z$ (W/m$^2$) in three axial directions (x, y, and z) orthogonal to each other at a sound receiving point in a sound field, and calculating a total value of the sound intensities $I_x$, $I_y$, and $I_z$ as $I_{all}=\sqrt{(I_x^2+I_y^2+I_z^2)}$; first extraction means for a sound source, for extracting a peak in a sound intensity waveform of the total value obtained by the measurement means for each time window while assuming that the peak indicates a sound source, and calculating a level of the sound source and a distance from the sound source from the extracted peak; and first estimation means for sound source coordinates, for estimating a peak width of the total value obtained by the first measurement means, calculating signed averaged values of magnitudes within peak widths in the sound intensities $I_x$, $I_y$, and $I_z$ corresponding to the peak width, and estimating coordinates of the sound source from the signed averaged values within the peak widths in the sound intensities $I_x$, $I_y$, and $I_z$ and the distance from the sound source obtained by the first extraction means.

Further, according to the invention (4), there is provided a detection device for a sound source, the detection device including: measurement means for sound intensities, for measuring sound intensities $I_x$, $I_y$, and $I_z$ (W/m$^2$) in three axial directions (x, y, and z) orthogonal to each other at a sound receiving point in a sound field, and calculating a total value of the sound intensities $I_x$, $I_y$, and $I_z$ as $I_{all} = \sqrt{(I_x^2 + I_y^2 + I_z^2)}$; second extraction means for a sound source, for: setting a threshold value of a spatial travel speed for distinguishing a sound intensity of the total value obtained in the measurement means between a source intensity component and a drifting intensity component; cutting out, from the sound intensity of the total value, the source intensity component exhibiting a spatial travel speed equal to or lower than the threshold value, or cutting out, from the sound intensity of the total value, the source intensity component corresponding to an arrival time of a sound particle velocity exhibiting a spatial travel speed equal to or lower than the threshold value based on a total value of sound particle velocities obtained by dividing the sound intensity of the total value by a sound pressure; and calculating averaged values of a strength and an arrival time of the cut-out source intensity component included as a piece to set a level of a sound source and a distance from the sound source; and second estimation means for sound source coordinates, for cutting out the sound intensities $I_x$, $I_y$, and $I_z$ included in the same time width as the piece being the source intensity component cut out by the second extraction means, calculating averaged values of signed magnitudes of the cut-out sound intensities $I_x$, $I_y$, and $I_z$, and estimating coordinates of the sound source from signed averaged values of the sound intensities $I_x$, $I_y$, and $I_z$ and the distance from the sound source obtained by the second extraction means.

Advantageous Effects of Invention

With the detection method for a sound source according to the invention A1 and the detection device therefor according to the invention B1, it is possible to detect the position of a sound source through use of the measurement results of the sound intensities more accurately than a detection method and a detection device that do not include the first extraction step (means) and the first estimation step (means).

Further, with the detection method for a sound source according to the invention A2 and the detection device therefor according to the invention B2, it is possible to detect the position of a sound source including the presence of the sound source through use of the measurement results of the sound intensities more accurately than a detection method and a detection device that do not include the second extraction step (means) and the second estimation step (means).

DESCRIPTION OF EMBODIMENTS

Now, modes for carrying out the present invention (hereinafter referred to simply as "embodiment(s)") are described with reference to the accompanying drawings.

First Embodiment

Figure 1:
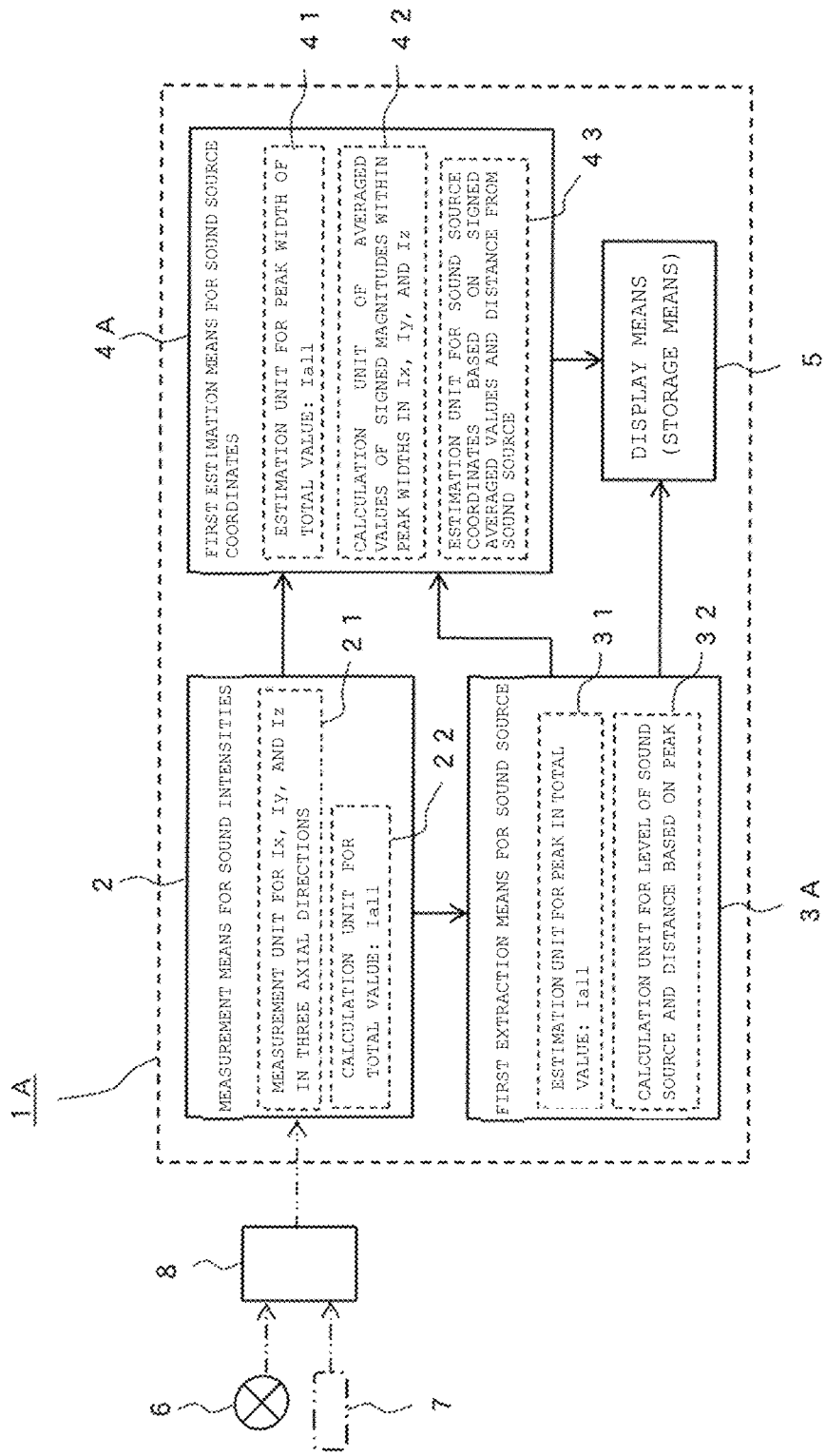
FIG. 1 is an explanatory diagram for illustrating an outline of a detection device for a sound source according to a first embodiment of the present invention.
Figure 2:
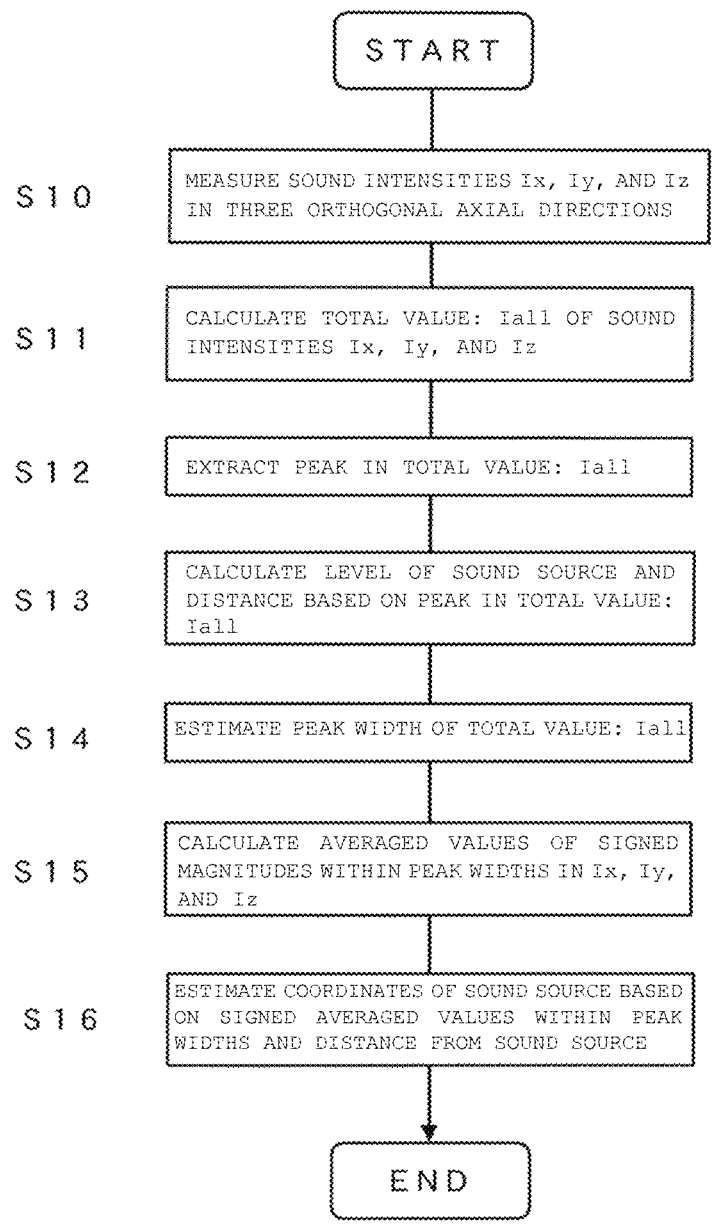
FIG. 2 is a flow chart for illustrating processing steps of a detection method for a sound source according to the first embodiment.

In FIG. 1 and FIG. 2, there are illustrated outlines of a detection method for a sound source and a detection device therefor according to a first embodiment. FIG. 1 is an illustration of the outline of the detection device for the sound source, and FIG. 2 is an illustration of the outline (steps) of the detection method for a sound source.

A detection device 1A for a sound source according to the first embodiment is a device capable of implementing the detection method for a sound source according to the first embodiment. Compared to a method 4 of detecting sound source information from sound intensities through use of "peak detection", which is described above, this detection method has a feature that the method 4 has been improved so as to be able to estimate a sound source position after extracting a sound source by performing processing with averaged values within a predetermined peak width instead of the magnitudes of peaks in the waveforms of the sound intensities. From this point of view, this detection method can be referred to as a method of detecting the sound source information from the sound intensities through use of a so-called "modified peak detection".

As illustrated in FIG. 1, the detection device 1A mainly includes measurement means 2 for sound intensities, first extraction means 3A for a sound source, and first estimation means 4A for a sound source position. As the requirement arises, the detection device 1A may also include display means (including storage means as well) 5, for example, a liquid crystal panel, for displaying information including results obtained by the respective means 2, 3A, and 4A.

The measurement means 2 for sound intensities, the first extraction means 3A for a sound source, and the first estimation means 4A for a sound source position, which are included in the detection device 1A, can be configured as, for example, software formed mainly of a program for processing the respective steps of the detection method and data required for the processing. The detection device 1A is also manufactured by being constructed to store or mount the program and data of the software on a personal computer or other such device so as to be operated. This point applies to a detection device 1B according to a second embodiment, which is described later.

Measurement Means and Measurement Step for Sound Intensities

As illustrated in FIG. 1, the measurement means 2 for sound intensities includes a measurement unit 21 configured to measure sound intensities $I_x$, $I_y$, and $I_z$ (W/m²) in three axial directions (x, y, and z) orthogonal to each other at a sound receiving point in a sound field, and a calculation unit 22 configured to calculate $I_{all}=\sqrt{(I_x^2+I_y^2+I_z^2)}$, which is a total value of the sound intensities $I_x$, $I_y$, and $I_z$.

In the detection method for a sound source, as illustrated in FIG. 2, processing of the measurement unit 21 and processing of the calculation unit 22 are performed as Step S10 and Step S11 in the stated order, and two processing steps indicated by Steps S10 and S11 are set collectively as a measurement step for sound intensities.

The measurement unit 21 is a portion configured to perform processing for calculating the sound intensities $I_x$, $I_y$, and $I_z$ by inputting information required for the measurement of sound intensities from a measurement device configured to measure information on a sound source in the sound field. As the measurement device, as illustrated in FIG. 1, for example, a measurement device including mainly a microphone 6, a sound particle velocity sensor 7, and a data acquisition device 8 is employed.

Figure 3:
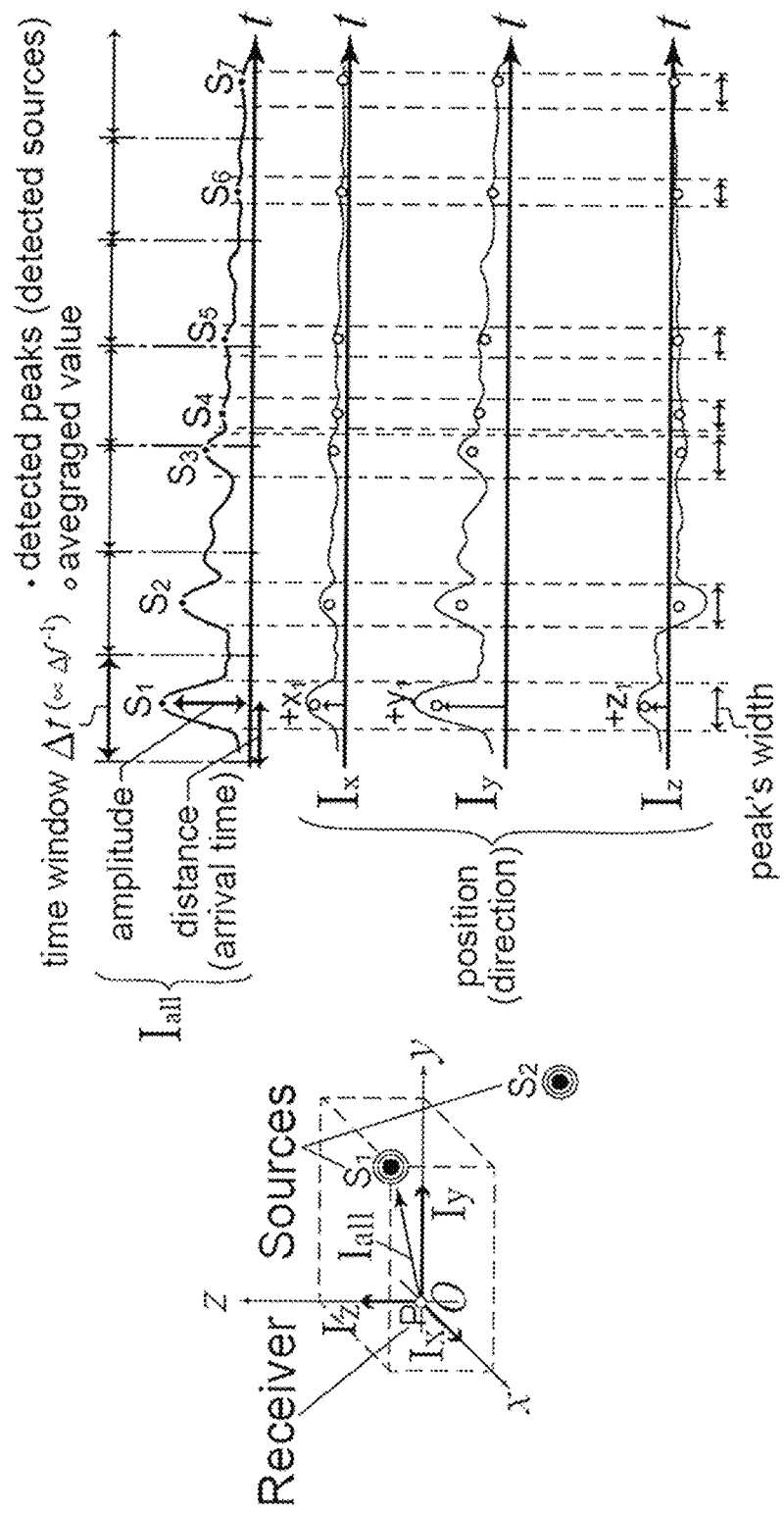
FIG. 3 is an explanatory diagram for illustrating a concept of the detection method illustrated in FIG. 2 or other such method and an example of results obtained in one process of the detection method.

When sound intensities are measured through use of only the microphone 6 of those components, as illustrated in the left part of FIG. 3, a sound pressure is measured by each microphone 6 in a sound field (interior of a room or other such closed space) in which sound sources (a plurality of sound sources including a real source $S_1$ and a virtual source $S_2$) set as targets to be estimated are present. Subsequently, sound information (sound pressures and sound particle velocities) required for obtaining the sound intensities $I_x$, $I_y$, and $I_z$ in the three axial directions (x, y, and z directions) orthogonal to each other at a sound receiving point P set at a time of the measurement is obtained from waveform information on the sound pressure measured by each microphone 6.

In another case, when the microphone 6 and the sound particle velocity sensor 7 are used to measure the sound intensities, the sound particle velocities included in the above-mentioned sound information are obtained by being directly measured by the sound particle velocity sensor 7 instead of being calculated from an output waveform of each microphone. In this case, the sound particle velocity sensor 7 is installed on each of the axes in the above-mentioned three axial directions.

The data acquisition device 8 is a device formed of, for example, a microphone amplifier and a storage device, which is configured to amplify and accumulate (store) the information on a sound source acquired by the microphone 6 and the sound particle velocity sensor 7.

The kind and number of microphones 6 to be used are determined depending on a measurement method for sound intensities. For example, in a case of a P-P method using an omnidirectional microphone, four or six omnidirectional microphones are used, and in a case of a C-C method using a unidirectional microphone, six unidirectional microphones are used.

Figure 4:
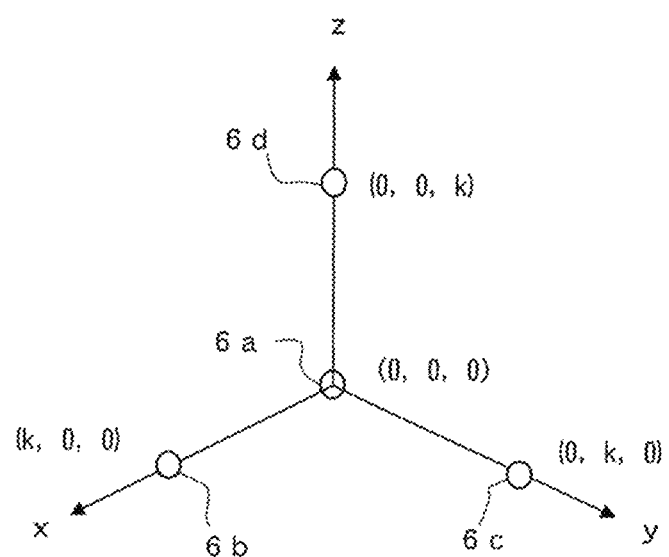
FIG. 4 is an explanatory diagram for illustrating an installation relationship between microphones for measuring sound intensities.

When measuring the measurement of sound intensities, the measurement unit 21 may solely use any one of the above-mentioned kinds of microphones 6, or may use a combination of the microphones 6 and the sound particle velocity sensors 7. For example, when the P-P method using four omnidirectional microphones is employed for the measurement, as exemplified in FIG. 4, four compact omnidirectional microphones 6a, 6b, 6c, and 6d are used after being configured to be supported by a jig (not shown) so as to be distributedly arranged at a position set as the origin (O) of axial directions and three positions on three orthogonal axes (x-axis, y-axis, and z-axis) each spaced apart from the origin by a predetermined distance (interval) k. In the example of FIG. 4, the microphone 6a is arranged at the position of the origin, the microphone 6b is arranged on the x-axis, the microphone 6c is arranged on the y-axis, and the microphone 6d is arranged on the z-axis. At this time, the interval k is set within, for example, a range of from 10 mm to 30 mm.

In an exemplary case of employing the P-P method using four omnidirectional microphones, the measurement is performed as follows.

Firstly, the omnidirectional microphones 6a, 6b, 6c, and 6d having the above-mentioned configuration are installed in the sound field to be measured. In this case, the omnidirectional microphones 6a, 6b, 6c, and 6d are installed so that the microphone 6a is arranged at the position of the origin O of the three orthogonal axes set as the sound field at the time of the measurement, the microphone 6c is arranged at a position (x=0, y=k, z=0) spaced apart by the distance k on the y-axis corresponding to a frontward direction of facing the real source $S_1$, the microphone 6b is arranged at a position (x=k, y=0, z=0) spaced apart by the distance k on the x-axis corresponding to a horizontally rightward direction with respect to the sound source $S_1$, and the microphone 6d is arranged at a position (x=0, y=0, z=k) spaced apart by the distance k on the z-axis corresponding to a vertically upward direction. The distance k was set to, for example, 15 mm.

Secondly, sound pressure waveforms obtained by playing back a measurement signal from the real source $S_1$ in the sound field and recording the measurement signal by the omnidirectional microphones 6a, 6b, 6c, and 6d installed in the above-mentioned state, or impulse responses calculated from the sound pressure waveforms, are stored in the data acquisition device 8.

Figure 5:
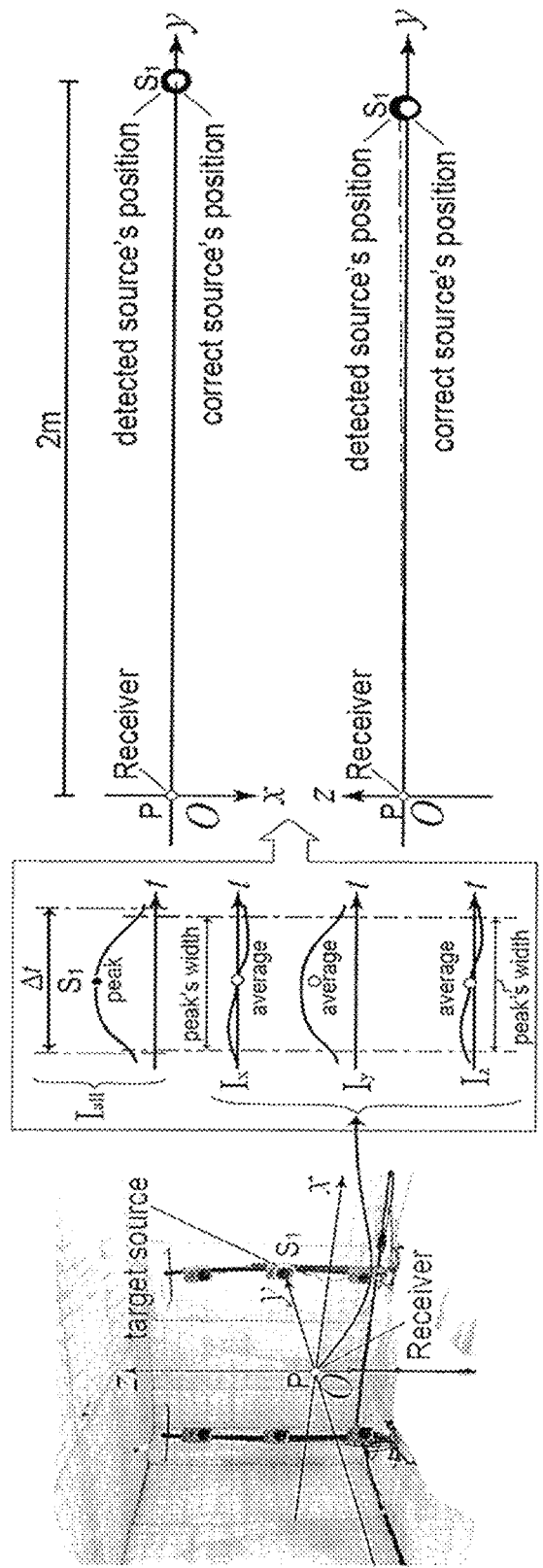
FIG. 5 is an explanatory diagram for illustrating a configuration example of a sound field in the detection method illustrated in FIG. 2 or other such method and an example of results obtained by the detection method.

In the first embodiment, as illustrated in the left part of FIG. 5, a room (closed space) in which sound absorbing materials are laid on its wall surfaces, ceiling surface and floor surface so that reflections are extremely small enough to allow only the real source $S_1$ to be detected as the sound source is employed as the sound field. This room has a size of 4 m, 3.3 m, and 4 m in dimensions of the x, y, and z directions, respectively.

As the real source $S_1$, a loudspeaker was used. Further, the loudspeaker was installed at a position of 2 m on the y-axis of the three orthogonal axes (coordinate position of x=0, y=2 m, and z=0) with the front part of the loudspeaker facing the origin O. The origin (O) of the three orthogonal axes was set at a height of 1.1 m from a position approximately at the center of the floor surface of the closed space.

Then, the measurement unit 21 obtains the sound intensities $I_x$, $I_y$, and $I_z$ by the following procedure.

First, when the above-mentioned P-P method using four omnidirectional microphones is employed, the sound pressures in the sound information are calculated as averages $p_x(t)$, $p_y(t)$, and $p_z(t)$ of the sound pressures in the x, y, and z directions at a time t as expressed below:

$p_x(t)=(p_a(t)+p_b(t))/2$ $p_y(t)=(p_a(t)+p_c(t))/2$ $p_z(t)=(p_a(t)+p_d(t))/2$ where $p_a(t)$, $p_b(t)$, $p_c(t)$, and $p_d(t)$ represent the sound pressures measured by the four microphones 6a, 6b, 6c, and 6d at the time t, respectively.

Subsequently, the sound particle velocities in the sound information are calculated as sound particle velocities $U_x(t)$, $U_y(t)$, and $U_z(t)$ in the x, y, and z directions at the time t, which are expressed by the following mathematical expressions.

[Math 1]

$$u_x(t) = \frac{1}{\rho k}\int_{-\infty}^{t}\{p_b(\tau) - p_a(\tau)\}d\tau,$$

$$u_y(t) = \frac{1}{\rho k}\int_{-\infty}^{t}\{p_c(\tau) - p_a(\tau)\}d\tau,$$

-continued $$u_z(t) = \frac{1}{\rho k}\int_{-\infty}^{t}\{p_d(\tau) - p_a(\tau)\}d\tau$$

Finally, the sound intensity is expressed as "(sound intensity)=(sound pressure)×(sound particle velocity)", and hence the sound intensities are obtained as the sound intensities $I_x(t)$, $I_y(t)$, and $I_z(t)$ in the x, y, and z directions at the time t, which are expressed by the following mathematical expressions, through use of measurement results of the sound pressures and the sound particle velocities described above.

$I_x(t)=p_x(t)\times u_x(t)$, $I_y(t)=p_y(t)\times u_y(t)$, and $I_z(t)=p_z(t)\times u_z(t)$ The calculation unit 22 is a portion configured to perform processing for using data on the sound intensities $I_x$, $I_y$, and $I_z$ obtained by the measurement unit 21 to calculate their total value $I_{all}$ by the following mathematical expression. The unit of the total value $I_{all}$ is also "W/m²".

$I_{all}=\sqrt{(I_x^2+I_y^2+I_z^2)}$

The results of the sound intensities $I_x$, $I_y$, and $I_z$ and the total value $I_{all}$ obtained by the measurement unit 21 and the calculation unit 22 of the measurement means 2 can be, for example, displayed on the display means 5 as such waveforms as illustrated in the right part of FIG. 3. A horizontal axis t illustrated in, for example, FIG. 3 represents an elapsed time since the measurement signal at the time of the measurement was played back, and the vertical direction (vertical axis) orthogonal to the horizontal axis t represents the amplitude of a waveform. The waveforms illustrated in the right part of FIG. 3 are an example of the waveforms of sound intensities obtained when the measurement is performed in a concert hall.

First Extraction Means and First Extraction Step for Sound Source

As illustrated in FIG. 1, the first extraction means 3A includes an extraction unit 31 configured to extract the peak in a sound intensity waveform of the total value $I_{all}$ obtained by the measurement means 2 (step) for each time window, and a calculation unit 32 configured to calculate the level of the sound source and a distance from the sound source based on the extracted peak.

In the detection method for a sound source, as illustrated in FIG. 2, processing of the extraction unit 31 and processing of the calculation unit 32 are performed as Steps S12 and S13 in the stated order, and two processing steps indicated by Steps S12 and S13 are set collectively as a first extraction step for a sound source.

The extraction unit 31 is a portion configured to perform processing for, while assuming that the peak in the sound intensity waveform of the total value $I_{all}$ indicates a sound source, extracting the peak for each time window Δt as illustrated in FIG. 3.

The time window Δt corresponds to the length of time for cutting out a certain data sequence from a continuous long time axis waveform to find the peak from the data sequence. With this, one peak is extracted for each interval of the time window Δt.

The time window Δt also has a value inversely proportional to an analysis bandwidth Δf (Hz) (Δt∝Δf⁻¹). For example, when the analysis bandwidth 66 f is 4,000 (Hz) (from 100 (Hz) to 4,100 (Hz)), the time window Δt is 1.3 (ms), and when the analysis bandwidth Δf is as narrow as 2,000 (Hz) (from 100 (Hz) to 2,100 (Hz)), the time window Δt is 3.5 (ms), which is a long value.

In FIG. 3, the respective peaks (portions indicated by the symbols "·" in FIG. 3) extracted for each interval of the time window Δt are denoted by the symbols $S_1$, $S_2$, $S_3$, $S_4$, ..., and those symbols indicate that the respective peaks correspond to the plurality of sound sources $S_1$, $S_2$, $S_3$, $S_4$, ... in the sound field, which are the targets to be estimated.

The calculation unit 32 is a portion configured to perform processing for calculating the level of the sound source and the distance from the sound source based on the extracted peak.

In this case, the level of the sound source indicates a strength of each of the real source $S_1$ and the reflections (virtual sources $S_2$, $S_3$, ...), that is, the volume of a sound that has arrived from each of the real source $S_1$ and the virtual sources $S_2$, $S_3$, .... The distance from the sound source indicates a distance from each of the real source $S_1$ and the virtual sources $S_2$, $S_3$, ... to the sound receiving point P. This distance from the sound source is divided by the speed of sound to obtain a value indicating an arrival time from the sound from real source and an arrival time from the reflections.

The level of the sound source and the distance from the sound source are calculated in the following manner.

The level of the sound source is calculated as the magnitude (value in terms of the vertical axis in FIG. 3) (W/m²) of the total value $I_{all}$ at each peak position. The distance from the sound source is calculated as a value (m) obtained by multiplying the time (s) (value in terms of the horizontal axis in FIG. 3) at each peak position by the speed of sound (m/s).

First Estimation Means and First Estimation Step for Sound Source Position

As illustrated in FIG. 1, the first estimation means 4A for a sound source position includes an estimation unit 41 configured to estimate a peak width of the total value $I_{all}$ obtained by the first measurement means 2 and in the measurement step performed thereby, a calculation unit 42 configured to calculate the averaged values of the signed magnitudes within peak widths in the sound intensities $I_x$, $I_y$, and $I_z$ corresponding to the peak width, and an estimation unit 43 configured to estimate the coordinates of the sound source from the averaged values of the signed magnitudes within the peak widths in the sound intensities $I_x$, $I_y$, and $I_z$ and the distance from the sound source obtained by the first extraction means 3A and in the step performed thereby.

In the detection method for a sound source, as illustrated in FIG. 2, processing of the estimation unit 41, processing of the calculation unit 42, and processing of the estimation unit 43 are performed as Steps S14 to S16 in the stated order, and three processing steps indicated by Steps S14 to S16 are set collectively as a first estimation step for a sound source position.

The estimation unit 41 is a portion configured to perform processing for estimating the peak width of the total value $I_{all}$ of the sound intensities.

In the estimation of the peak width, for example, an interval between the start point and the end point of a waveform segment that rises before and after each peak extracted for each interval of the time window Δt in the sound intensity waveform of the total value is estimated as the peak width. Specifically, time points corresponding to two spots before and after each peak extracted for each interval of the time window Δt in the above-mentioned intensity waveform, at which a change amount (for example, slope) of the waveform becomes gradual again when a spot of interest is moved backward and forward from the each peak on the time axis, are analyzed, and a waveform segment sandwiched between the time points corresponding to the two spots before and after the each peak can be obtained as the peak width.

With the estimation processing performed by the estimation unit 41, as illustrated in the upper right part of FIG. 3 and the central part of FIG. 5, a segment sandwiched between the one dot chain lines is obtained as the peak width corresponding to each peak extracted for each interval of the time window Δt.

The calculation unit 42 is a portion configured to perform processing for calculating signed averaged values of the magnitudes within respective peak widths in the sound intensities $I_x$, $I_y$, and $I_z$ corresponding to each peak width estimated by the estimation unit 41.

As illustrated in the lower right part of FIG. 3, the respective peak widths in the sound intensities $I_x$, $I_y$, and $I_z$ corresponding to the each peak width are waveform segments sandwiched within the same range (between the same time points) as the segment sandwiched between the two broken lines, which is estimated in the waveform of the sound intensity of the total value $I_{all}$, in the respective waveforms of the sound intensities $I_x$, $I_y$, and $I_z$.

Assuming that, for example, a start time of the peak width is $t_1$ and an end time thereof is $t_2$ with $I_x$, $I_y$, and $I_z$ at the time t being represented by $I_x(t)$, $I_y(t)$, and $I_z(t)$, the averaged values (±|$I_x$_ave|, ±|$I_y$_ave|, and ±|$I_z$_ave|) of the signed magnitudes of the sound intensities $I_x$, $I_y$, and $I_z$ within the respective peak widths are calculated based on the following mathematical expressions.

$$I_{x\_ave} = \frac{1}{t_2 - t_1} \int_{t_1}^{t_2} I_x(t)dt,$$

$$I_{y\_ave} = \frac{1}{t_2 - t_1} \int_{t_1}^{t_2} I_y(t)dt,$$

$$I_{z\_ave} = \frac{1}{t_2 - t_1} \int_{t_1}^{t_2} I_z(t)dt$$

[Math 2]

With the calculation processing performed by the calculation unit 42, as illustrated in the lower right part of FIG. 3, the signed averaged values (portions indicated by the symbols "○" in FIG. 3) in the respective peak widths of the respective sound intensity waveforms of $I_x$, $I_y$, and $I_z$ are obtained.

The estimation unit 43 is a portion configured to perform processing for estimating the coordinates of the sound source from the signed averaged values within the peak widths in the sound intensities $I_x$, $I_y$, and $I_z$, which is obtained by the calculation unit 42, and the distance from the sound source, which is obtained by the first extraction means 3A and in the step performed thereby.

For example, the coordinates of the sound source are estimated as a spot spaced apart along a direction (±|$I_x$_ave|, ±|$I_y$_ave|, ±|$I_z$_ave|) from the origin, which is expressed by the signed averaged values (±|$I_{x\_ave}$|, ±|$I_{y\_ave}$|, and ±|$I_{z\_ave}$|) of the sound intensity waveforms in the x, y, and z directions within the peak widths corresponding to a given peak, by a distance given by the peak of the total value $I_{all}$ calculated in the first estimation step. At this time, for example, when the distance given by the peak of the total value $I_{all}$ calculated by the first extraction step for a sound source or the like is L (m) and the direction calculated from $I_x$, $I_y$, and $I_z$ is (+2,−3,+4), the spot spaced apart by the distance given by the peak of the total value $I_{all}$ means the position spaced apart from the origin 0 of the three orthogonal axes by an amount corresponding to the distance (length) L (m) along a direction from the origin 0 toward the coordinates (+2,−3,+4).

As illustrated as partial results in the right part of FIG. 5, it is understood that, with the calculation processing performed by the calculation unit 42, coordinates (black circle in FIG. 5) estimated for the real source $S_1$ being the target to be estimated substantially agree with a position (x=0, z=0) of 2 m on the y-axis, which is a correct position (white circle) of the real source $S_1$.

Detection Result of Sound Source Position

With the method of detecting the sound source information from the sound intensities through use of the detection method for a sound source (detection device 1A therefor) according to the first embodiment, that is, the so-called "modified peak detection", the following point becomes clear from the partial results illustrated in the right part of FIG. 5.

That is, with this detection method, residual waveforms due to measurement errors are found in the sound intensities $I_x$ and $I_z$ in the x direction and the z direction (central part of FIG. 5), but the averaged value of the magnitudes in each peak width is employed unlike the method 4 of detecting the sound source information from the sound intensities through use of the "peak detection", and hence both the sound intensities $I_x$ and $I_z$ in the x direction and the z direction have been successfully recognized as values (coordinates) of substantially zero without being dominated by a specific value in the residual waveforms.

Figure 20:
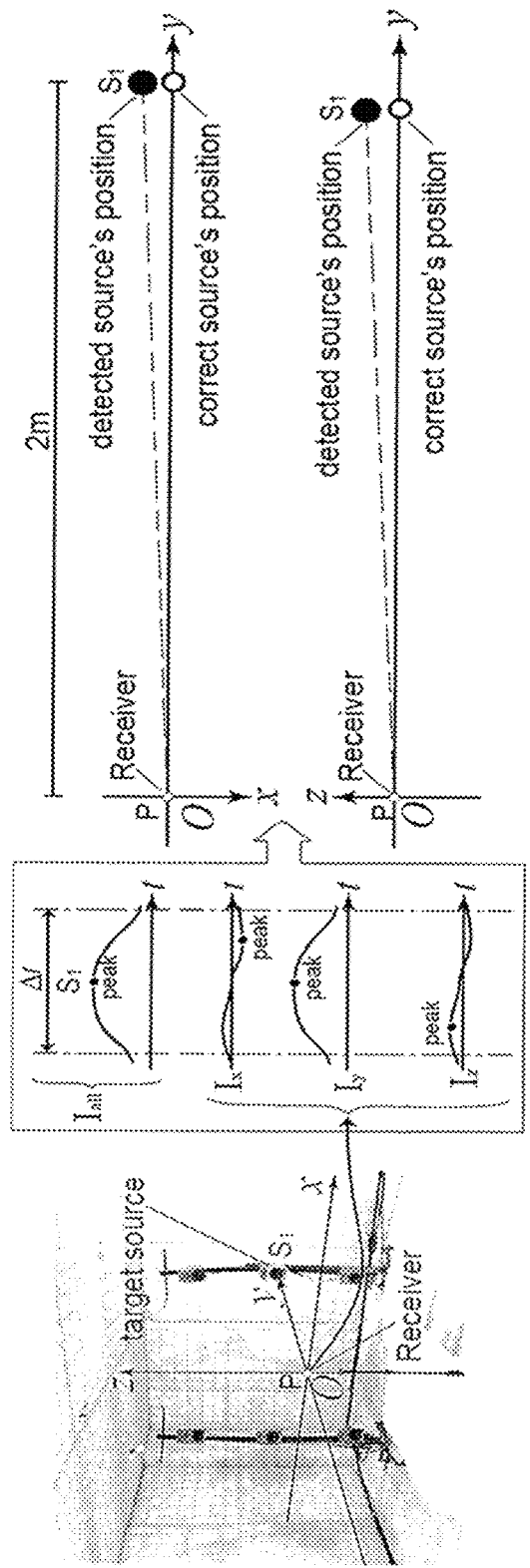
FIG. 20 is an explanatory diagram for illustrating a configuration example of a sound field in the detection method 4 illustrated in FIG. 19 and an example of results obtained by the detection method 4.
Figure 21:
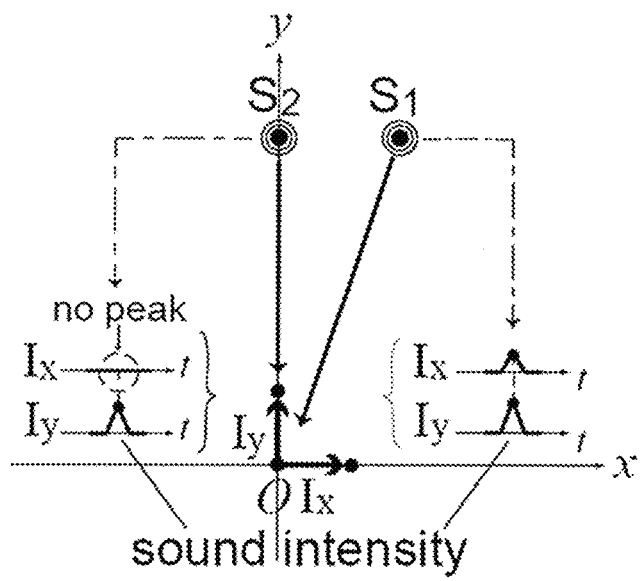
FIG. 21 is an explanatory diagram for illustrating an example of a case in which sound source information cannot be obtained from peak information on waveforms of the sound intensities.

As a result, as illustrated as the partial results in the right part of FIG. 5, the position (black circle) of the sound source $S_1$ detected (estimated) at this time is estimated in a place that substantially agrees with the correct position (white circle) of the sound source $S_1$ supposed to be located on the y-axis. That is, with this detection method, compared to the detection method 4 (see FIG. 20), it is understood that the position of the sound source $S_1$ is estimated on the y-axis with high accuracy, and the estimation accuracy of the coordinates of the sound source has been improved.

Therefore, with this detection method and the detection device 1A therefor, it is possible to accurately detect the position of a sound source.

Second Embodiment

Figure 6:
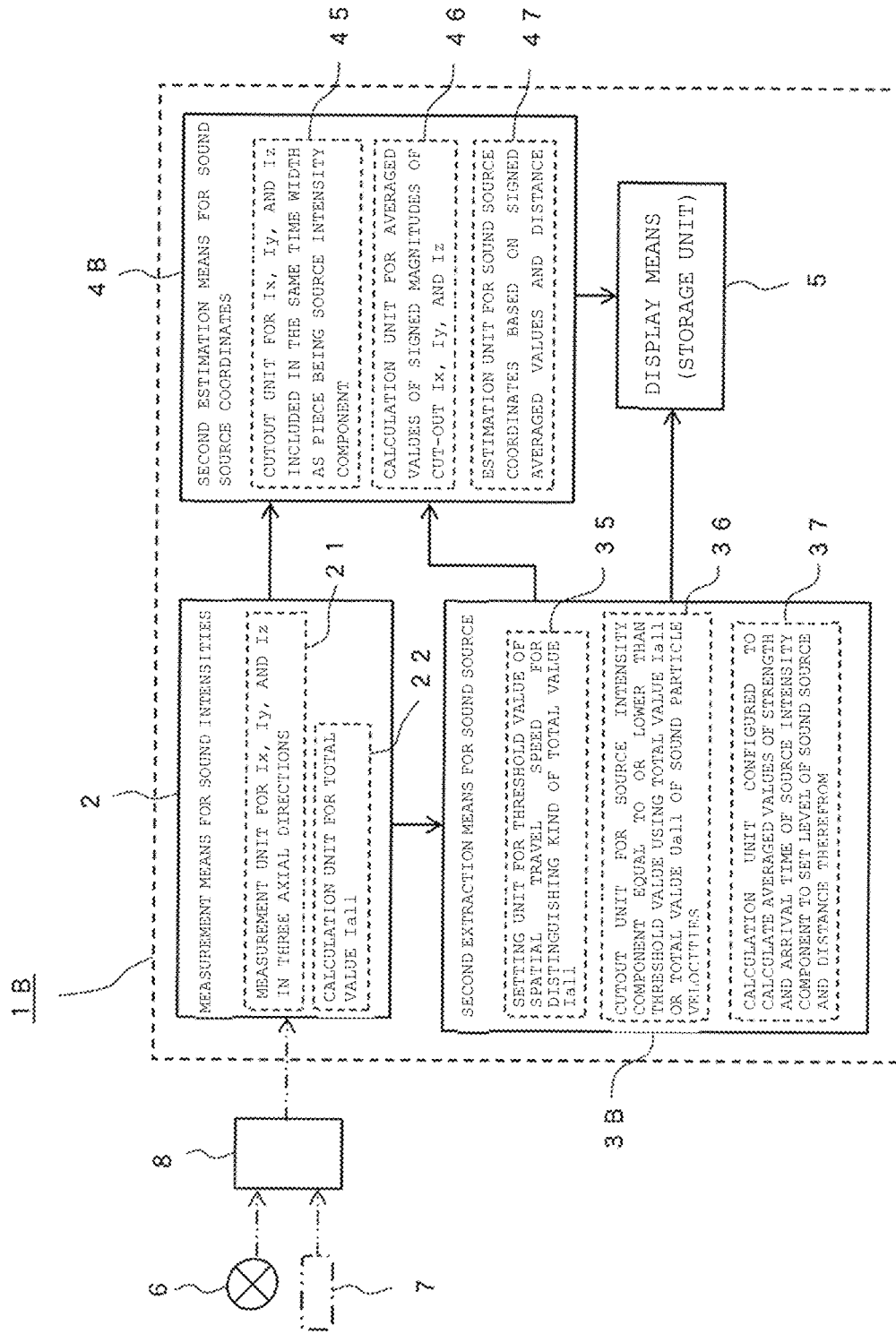
FIG. 6 is an explanatory diagram for illustrating an outline of a detection device for a sound source according to a second embodiment of the present invention.
Figure 7:
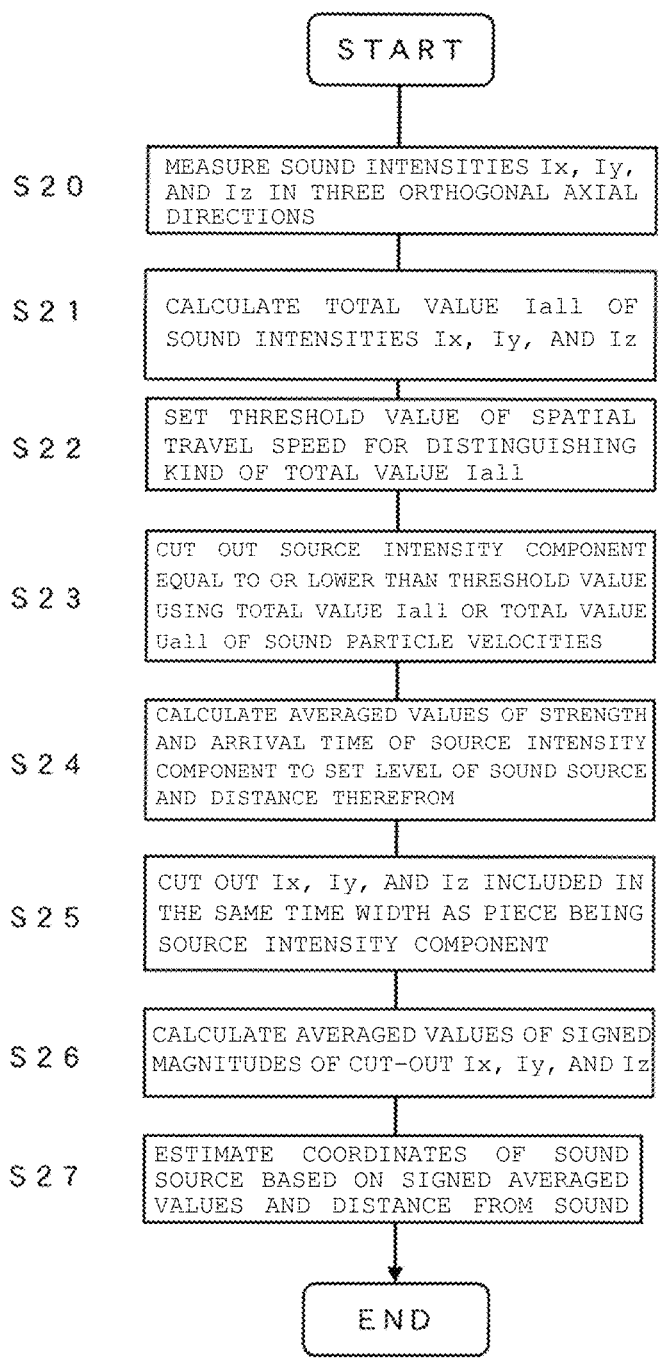
FIG. 7 is a flow chart for illustrating processing steps of a detection method for a sound source according to the second embodiment.

In FIG. 6 and FIG. 7, there are illustrated outlines of a detection method for a sound source and a detection device therefor according to a second embodiment. FIG. 6 is an illustration of the outline of the detection device for the sound source, and FIG. 7 is an illustration of the outline (steps) of the detection method for a sound source.

A detection device 1B for a sound source according to the second embodiment is a device capable of implementing the detection method for a sound source according to the second embodiment. Unlike the method 4 of detecting the sound source information from the sound intensities through use of the "peak detection" and the detection method according to the first embodiment, this detection method has a feature that the estimation of the sound source position is suitably executed after extracting the sound source with attention being given to a spatial travel speed of a sound intensity or a sound particle velocity without using the peak detection at all fora reason described later. From this point of view, this detection method can be referred to as a method of detecting the sound source information from the sound intensities through use of a so-called "speed detection".

As illustrated in FIG. 6, the detection device 1B mainly includes measurement means 2 for sound intensities, second extraction means 3B for a sound source, and second estimation means 4B for a sound source position. As the requirement arises, as in the case of the detection device 1A according to the first embodiment, the detection device 1B may also include display means (including a storage means as well) 5, for example, a liquid crystal panel, for displaying information including results obtained by the respective means 2, 3B, and 4B.

Now, a description is given of the background that has led to the completion of the detection method for a sound source and the detection device 1B therefor according to the second embodiment.

First of all, its idea was triggered by the discovery of a possibility that, with the detection method and the detection device 1A therefor according to the first embodiment, the presence of a sound source itself cannot be correctly recognized from, for example, measurement results in which the waveforms of the sound intensities exhibit a sharp change or measurement results in which almost no change is exhibited contrarily.

The reason for the possibility that the presence cannot be correctly recognized is assumed to reside in that the detection method and the detection device 1A therefor according to the first embodiment employs the method of detecting the peaks of the waveforms of the sound intensities (modified peak detection) in the first extraction step (first extraction means 3A) for a sound source for discriminating the presence of a sound source.

Figure 22:
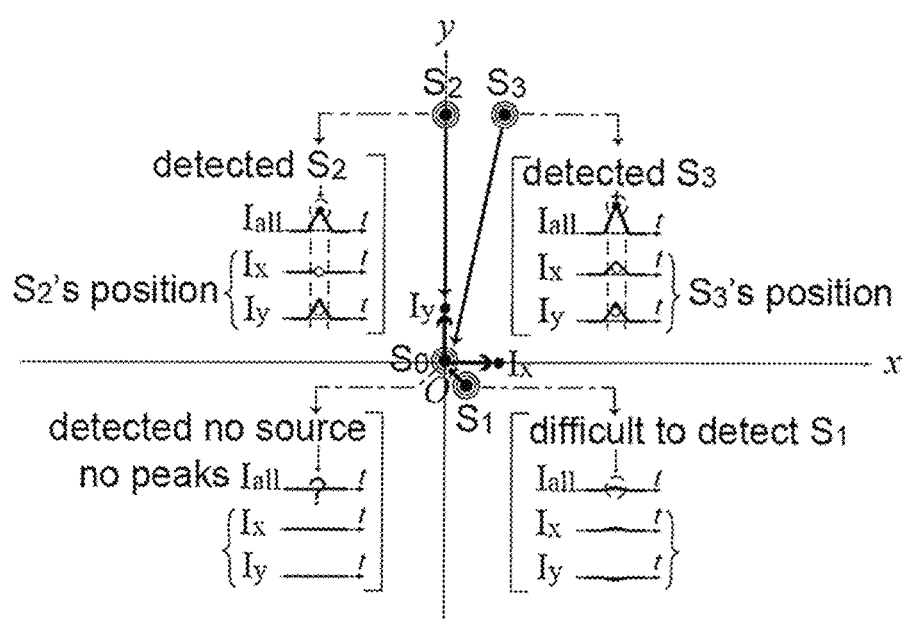
FIG. 22 is an explanatory diagram for illustrating an example of a case in which there is a possibility that a sound source cannot be correctly extracted in the detection method illustrated in FIG. 2.

Specifically, when there are, for example, a sound source $S_0$ at the origin (O) of the three orthogonal axial directions and the sound source $S_1$ near the origin as exemplified in FIG. 22, in principle, the amplitudes of the sound intensity waveforms and their changes become zero or minimum (see results exemplified in the lower left part and the lower right part of FIG. 22). In addition, when actual measurement is performed on the sound source $S_0$ and the sound source $S_1$, the waveforms of the sound intensities often become rough waveforms including a large number of errors. In short, it is difficult to correctly extract the peaks themselves of the sound intensity waveforms of the sound sources $S_0$ and $S_1$ present at the origin and its near position.

Therefore, even when the detection method of the "modified peak detection" described above is used for such sound sources ($S_0$ and $S_1$) present at the origin and its near position, there is a possibility that the sound sources cannot be correctly extracted.

Therefore, as a result of conducting extensive studies in view of the foregoing circumstances, the inventor of the present invention has found out that a method of extracting a sound source with attention being given to the spatial travel speed of a sound intensity or a sound particle velocity is effective as a method of extracting a sound source without using the method of detecting the peaks, and has finally reached the completion of a method of detecting the position of a sound source from the sound intensities through use of the "speed detection" and a detection device therefor.

Then, this detection method and the detection device 1B therefor are established on the following assumption.

Specifically, it is assumed that the sound intensities include the following two kinds of components.

1. A component indicating a sound source. This is hereinafter referred to as "source intensity component".
2. A component that is drifting between sound sources. This is hereinafter referred to as "drifting intensity component".

The above-mentioned two kinds of intensity components are assumed to have the following properties.

3. The source intensity component is slow in spatial travel speed.
4. The drifting intensity component is fast in spatial travel speed.

Figure 8:
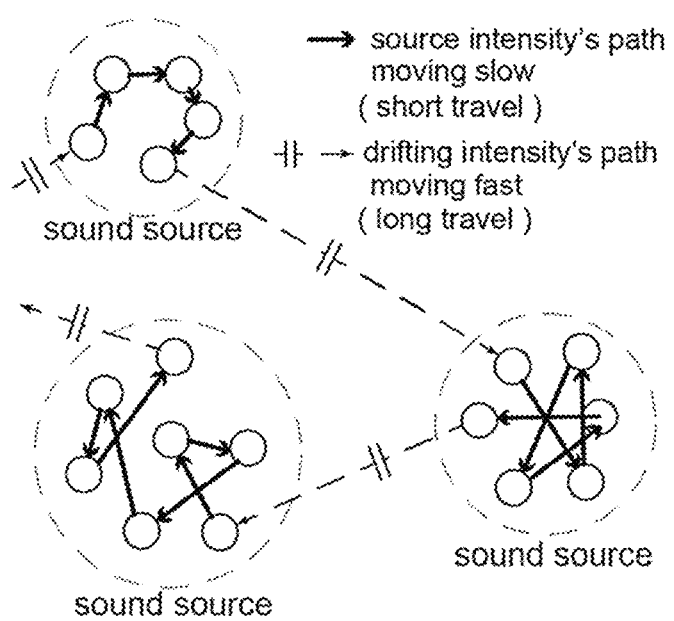
FIG. 8 is an explanatory diagram for illustrating a concept and properties of a source intensity component and a drifting intensity component.

FIG. 8 is a graphical representation of this assumption for reference.

Therefore, this detection method and the detection device 1B therefor are configured to extract a sound source from the waveforms of the sound intensities by the speed detection based on the above-mentioned assumption.

The description of this detection method and the detection device 1B therefor is continued below.

Measurement Means and Measurement Step for Sound Intensities

As illustrated in FIG. 6, the measurement means 2 for sound intensities includes the measurement unit 21 configured to measure the sound intensities $I_x$, $I_y$, and $I_z$ (W/m²) in the three axial directions (x, y, and z) orthogonal to each other at the sound receiving point in the sound field, and the calculation unit 22 configured to calculate $I_{all} = \sqrt{(I_x^2 + I_y^2 + I_z^2)}$, which is the total value of the sound intensities $I_x$, $I_y$, and $I_z$.

The measurement unit 21 and the calculation unit 22 have the same configurations as those of the measurement unit 21 and the calculation unit 22 of the detection device 1A according to the first embodiment.

In the detection method for a sound source, as illustrated in FIG. 7, processing of the measurement unit 21 and processing of the calculation unit 22 are performed as Step 20 and Step 21 in the stated order, and two processing steps indicated by Steps 20 and 21 are set collectively as a measurement step for sound intensities.

This measurement step for sound intensities also has the same configurations as that of the measurement step for sound intensities of the detection method according to the first embodiment.

Figure 9:
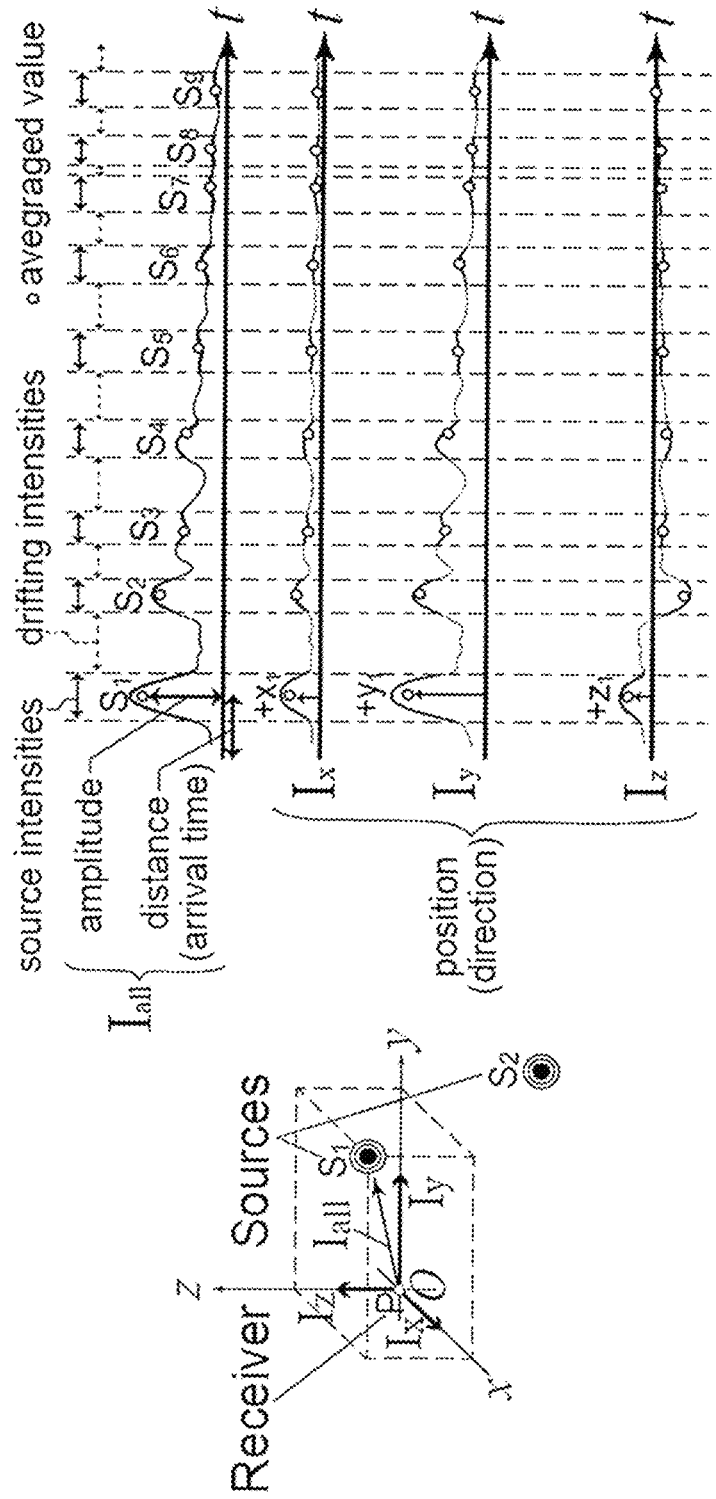
FIG. 9 is an explanatory diagram for illustrating a concept of the detection method illustrated in FIG. 7 or other such method and an example of results obtained in one process of the detection method.

A concept of this measurement performed by the measurement unit 21 is exemplified in the left part of FIG. 9.

Further, in the same manner as in the case of the first embodiment (FIG. 3), the results of the sound intensities $I_x$, $I_y$, and $I_z$ and the total value $I_{all}$ obtained by the measurement unit 21 and the calculation unit 22 of the measurement means 2 can be, for example, displayed on the display means 5 as such waveforms as illustrated in the right part of FIG. 9. The waveforms illustrated in the right part of FIG. 9 are an example of the waveforms of the sound intensities obtained when the measurement is performed in the concert hall.

In addition, as described regarding the measurement means and the measurement step in the first embodiment, in the measurement means 2 and the measurement step performed thereby, the sound particle velocities $U_x$, $U_y$, and $U_z$ (m/s) included in the sound information required for obtaining the sound intensities are obtained, and hence their total value $U_{all} = \sqrt{(U_x^2 + U_y^2 + U_z^2)}$ (m/s) can also be calculated simultaneously.

Second Extraction Means and Second Extraction Step for Sound Source

As illustrated in FIG. 6, the second extraction means 3B includes a setting unit 35 configured to set a threshold value Vs of a spatial travel speed for distinguishing the sound intensity of the total value $I_{all}$ obtained by the measurement means 2 and in the measurement step performed thereby between the source intensity component and the drifting intensity component based on the above-mentioned assumption, and a cutout unit 36 configured to: cut out the source intensity component exhibiting a spatial travel speed equal to or lower than the threshold value Vs from the sound intensity of the total value $I_{all}$, or cut out the source intensity component corresponding to the arrival time of the sound particle velocity exhibiting a spatial travel speed equal to or lower than the threshold value Vs based on the sound particle velocity of the total value $U_{all}$ from the sound intensity of the total value $I_{all}$; and a calculation unit 37 calculate the averaged values of the strength and the arrival time of the source intensity component included as the cut-out piece to set the level of the sound source and the distance from the sound source.

In the detection method for a sound source, as illustrated in FIG. 7, processing of the setting unit 35, processing of a cutout unit 36, and processing of the calculation unit 37 are performed as Steps S22 to S24 in the stated order, and three processing steps indicated by Steps S22 to S24 are set collectively as a second extraction step for a sound source.

The setting unit 35 is a portion configured to perform processing for setting the threshold value Vs appropriately for cutting out, in particular, the source intensity component from the sound intensity of the total value $I_{all}$.

The threshold value Vs strictly changes depending on a measurement environment (for example, size of a room or other such sound field and distance from a sound source) and analysis conditions, and is generally a value proportional to the arrival time t (s) of a sound.

The threshold value Vs can be obtained by, for example, the following mathematical expression given as a function of the arrival time t (s).

$$Vs = (t \times 1{,}000 + 10)^{1.5} \times 40 \text{ (m/s)}$$

In the above-mentioned expression, "1,000" indicates the conversion of the unit of the arrival time t from "s" into "ms", "1.5" indicates a dimension proportional to the arrival time t, and "40" indicates a ratio used when the arrival time t is converted into the threshold value Vs of the spatial travel speed.

In the second embodiment, the distance from the sound receiving point P (origin 0) to the real source $S_1$ is set to 2 (m), and hence the arrival time t of the sound from the real source $S_1$ is t=2/344=0.005814 (s). The value "344" indicates the speed of sound (m/s) at a temperature of 20° C.

Therefore, the threshold value Vs is set at this time to Vs=(0 005814×1,000+10)$^{1.5}$×40=2, 516 (m/s) based on the above-mentioned mathematical expression.

The cutout unit 36 is a portion configured to perform processing for cutting out the source intensity component exhibiting the spatial travel speed equal to or lower than the threshold value Vs from the sound intensity of the total value $I_{all}$.

The cutout of the source intensity component is performed in the following manner.

Firstly, the arrival time of the sound intensity or the sound particle velocity exhibiting the spatial travel speed equal to or lower than the threshold value Vs, that is, the arrival time of the source intensity component, is extracted from the sound intensity of the total value $I_{all}$ or the total value $U_{all}$ of the sound particle velocities.

In order to extract the arrival time of the source intensity component, a travel distance from coordinates at a given time to coordinates at the subsequent time in the total value $I_{all}$ of the sound intensities, or a travel distance from coordinates at a given time to coordinates at the subsequent time in the total value $U_{all}$ of the sound particle velocities is calculated first. For example, when the measurement is performed under the condition of a sampling frequency of 48,000 (Hz), the minimum time interval from a given time to the subsequent time is 1/48,000 (s).

Secondly, the above-mentioned travel distance is divided by a travel time to calculate the spatial travel speed of a sound intensity or a sound particle velocity. When the spatial travel speed obtained by this calculation becomes a small value equal to or lower than the threshold value Vs, a time at this time is set as "$t_s$". The above-mentioned calculation of the spatial travel speed of a sound intensity or a sound particle velocity is continued in the same manner. When the spatial travel speed obtained by this continued calculation becomes a value larger than the threshold value Vs, a time at this time is set as "$t_e$". The time period from the time $t_s$ until the time $t_e$ is the above-mentioned arrival time of the source intensity component to be extracted.

Finally, the total value $I_{all}$ of the sound intensities included in the extracted arrival time from the time $t_s$ until the time $t_e$ is cut out.

Here, the cut-out total value $I_{all}$ group is referred to as "piece of the sound intensity of the total value $I_{all}$". At this time, the cut-out piece of the sound intensity of the total value $I_{all}$ is formed of only source intensity components, and indicates one given sound source.

A result of the source intensity component cut out by the cutout unit 36 is exemplified in the upper right part of FIG. 9.

In FIG. 9, a waveform segment sandwiched between two broken lines (range, or time width, indicated by the solid double-headed arrow) in the waveform of the sound intensity of the total value $I_{all}$ corresponds to the cut-out source intensity component. In this case, in FIG. 9, a waveform segment between source intensity components (range, or time width, indicated by the broken double-headed arrow) in the waveform of the sound intensity of the total value $I_{all}$ corresponds to the drifting intensity component exhibiting the spatial travel speed higher than the threshold value Vs.

It is conceivable that the cut-out piece of the sound intensity of $I_{all}$ (waveform segment indicated by one solid double-headed arrow in FIG. 9, that is, part corresponding to the source intensity component) indicates one sound source.

In FIG. 9, values obtained by calculating the averaged values of the magnitude and time for each of the cut-out pieces of the sound intensity (source intensity components) are indicated by each of the white circles "○". Those white circles are the extracted sound sources $S_1$, $S_2$, $S_3$, $S_4$, . . . .

The calculation unit 37 is a portion configured to perform processing for calculating the averaged values of the strength and the arrival time of the source intensity component included as the piece of the sound intensity of the total value $I_{all}$ cut out by the cutout unit 36.

In this case, as illustrated in FIG. 9, the above-mentioned strength refers to the amplitude (value in the vertical axis in FIG. 9) of the waveform segment of the source intensity component. In addition, as illustrated in FIG. 9, the above-mentioned arrival time refers to a required time (value in the horizontal axis in FIG. 9) for information on the source intensity component to arrive at the sound receiving point from a given sound source.

At this time, the calculation is performed in the following manner.

That is, assuming that a cutout start time of the total value $I_{all}$ of the sound intensities is $t_1$ and a cutout end time thereof is $t_2$ with the total value $I_{all}$ at the time t being represented by $I_{all}(t)$ an averaged value $I_{all\_ave}$ of the strength and an averaged value $t_{ave}$ of the arrival time are each calculated based on the following mathematical expressions.

$$I_{all\_ave} = \frac{1}{t_2 - t_1} \int_{t_1}^{t_2} I_{all}(t)dt,$$

$$t_{ave} = \frac{t_1 + t_2}{2}$$

[Math 3]

The calculation unit 37 finally sets the averaged values of the strength and the arrival time of the source intensity component calculated in this manner as the magnitude of each of the sound sources ($S_1$, $S_2$, $S_3$, $S_4$, . . . ) and the distance therefrom. The level of the sound source and the distance from the sound source referred to herein have the same concept as the level of the sound source and the distance from the sound source calculated by the first extraction unit 31A for a sound source and in the extraction step performed thereby in the first embodiment.

In FIG. 9, the magnitude (averaged value of the strength) of each of the sound sources ($S_1$, $S_2$, $S_3$, $S_4$, . . . ) is indicated by the white circles "○".

Second Estimation Means and Second Estimation Step for Sound Source Position

As illustrated in FIG. 6, the second estimation means 4B for a sound source position includes a cutout unit 45 configured to cut out the sound intensities $I_x$, $I_y$, and $I_z$ included in the same time width as the piece being the source intensity component cut out by the second extraction means 3B and in the extraction step performed thereby, a calculation unit 46 configured to calculate the averaged values of the magnitudes of the cut-out sound intensities $I_x$, $I_y$, and $I_z$ and an estimation unit 47 configured to estimate the coordinates of the sound source from the averaged values of the magnitudes of the sound intensities $I_x$, $I_y$, and $I_z$ and the distance from the sound source obtained by the second extraction means 3B and in the extraction step performed thereby.

In the detection method for a sound source, as illustrated in FIG. 7, processing of the cutout unit 45, processing of the calculation unit 46, and processing of the estimation unit 47 are performed as Steps 25 to 27 (S25 to S27) in the stated order, and three processing steps indicated by Steps 25 to 27 are set collectively as a second estimation step for a sound source position.

The cutout unit 45 is a portion configured to perform processing for cutting out the sound intensities $I_x$, $I_y$, and $I_z$ included in the same time width as the cut-out piece being the source intensity component. In this case, the same time width as the piece being the source intensity component is a time width of each segment sandwiched between the two broken lines (range indicated by the solid double-headed arrow) in the right part of FIG. 9. In addition, the cutout of the sound intensities $I_x$, $I_y$, and $I_z$ is performed at this time by extracting information on the waveform segments in the waveforms of the respective sound intensities $I_x$, $I_y$, and $I_z$, the waveform segments each being sandwiched in each of the above-mentioned time widths.

The calculation unit 46 is a portion configured to perform processing for calculating the averaged values of the signed magnitudes of the sound intensities $I_x$, $I_y$, and $I_z$ cut out by the cutout unit 45.

At this time, the averaged values of the magnitudes are calculated in the following manner.

Specifically, assuming that the cutout start time of the total value $I_{all}$ of the sound intensities is $t_1$ and the cutout end time is $t_2$ with the values of $I_x$, $I_y$, and $I_z$ at the time t being represented by $I_x(t)$, $I_y(t)$, and $I_z(t)$, the averaged values ($\pm|I_x\_ave|$, $\pm|I_y\_ave|$, and $\pm|I_z\_ave|$) of the signed magnitudes of $I_x$, $I_y$, and $I_z$ at the time t are each calculated based on the following mathematical expressions.

$$I_{x\_ave} = \frac{1}{t_2 - t_1}\int_{t_1}^{t_2} I_x(t)dt, \quad [\text{Math 4}]$$

$$I_{y\_ave} = \frac{1}{t_2 - t_1}\int_{t_1}^{t_2} I_y(t)dt,$$

$$I_{z\_ave} = \frac{1}{t_2 - t_1}\int_{t_1}^{t_2} I_z(t)dt$$

With the calculation processing performed by the calculation unit 46, as illustrated in the lower right part of FIG. 9, the averaged values (portions indicated by the white circles "○" in FIG. 9) of the magnitudes of the respective sound intensities (respective source intensities) $I_x$, $I_y$, and $I_z$ within the above-mentioned time widths are each obtained. In FIG. 9, $+x_1$, $+y_1$, and $+z_1$ added to the waveforms of the sound intensities $I_x$, $I_y$, and $I_z$ indicate that values with a plus sign have been obtained as the signed averaged values of $I_x$, $I_y$, and $I_z$ corresponding to the sound source $S_1$, respectively.

The estimation unit 47 is a portion configured to perform processing for estimating the coordinates of the sound source from the average value of the magnitudes of the sound intensities $I_x$, $I_y$, and $I_z$, which is obtained by the calculation unit 46, and the distance from the sound source, which is obtained by the second extraction means 3B and in the extraction step performed thereby.

For example, when $+x_1$, $+y_1$, and $+z_1$ have been obtained as the signed averaged values of $I_x$, $I_y$, and $I_z$ in the x, y, and z directions corresponding to the sound source $S_1$, respectively, the coordinates of the sound source are estimated as a spot spaced apart along a direction $(+x_1, +y_1, +z_1)$ from the origin by a value obtained by multiplying the average $t_{ave}$ of the arrival time from the sound source $S_1$ calculated by the calculation unit 37 by the speed of sound, that is, by the distance from the origin of the sound source.

Figure 10:
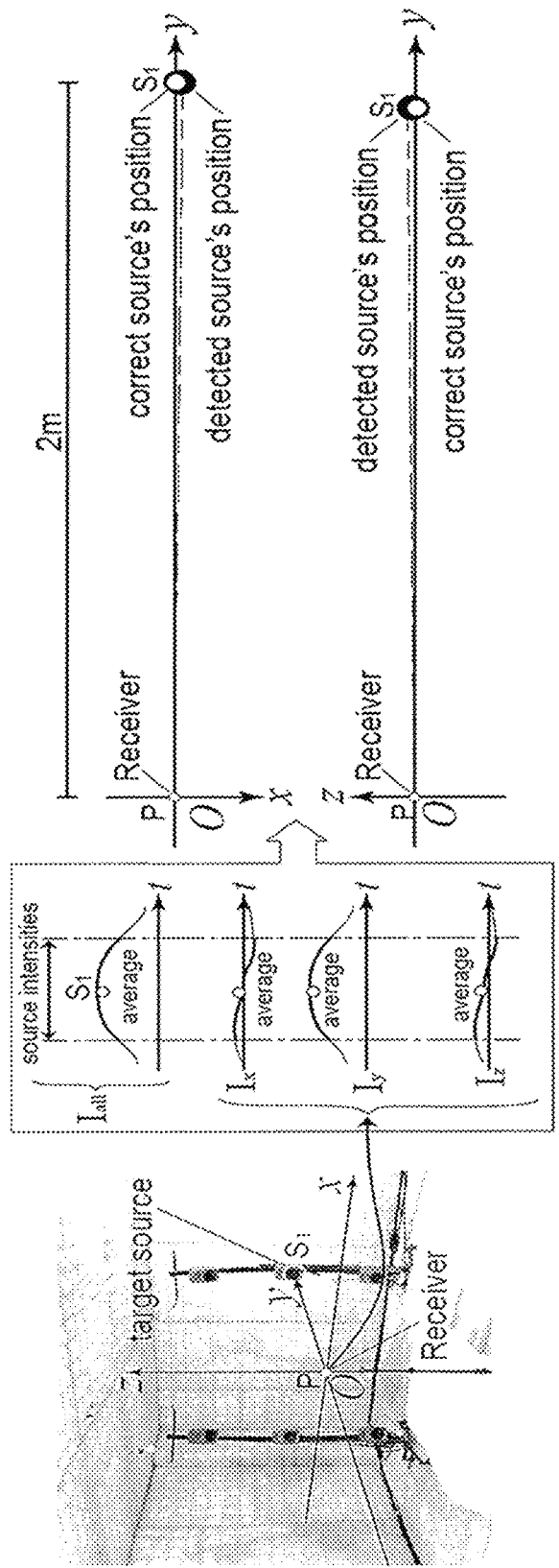
FIG. 10 is an explanatory diagram for illustrating a configuration example of a sound field in the detection method illustrated in FIG. 7 or other such method and an example of results obtained by the detection method.

As illustrated as partial results in the right part of FIG. 10, it is understood that, with the estimation processing performed by the estimation unit 47, coordinates (black circle in FIG. 10) estimated for the real source $S_1$ being the target to be estimated substantially agree with the position (x=0, z=0) of 2 m on the y-axis, which is the correct position (white circle) of the real source $S_1$.

Detection Result 1 of Sound Source Position

With the method of detecting the sound source information from the sound intensities through use of the detection method for a sound source (detection device 1B therefor) according to the second embodiment, that is, the so-called "speed detection", the following point becomes clear from the partial results illustrated in the right part of FIG. 10.

That is, with this detection method, a slight amount of errors occur in the estimation of the position in the x direction as compared to the detection results (FIG. 5) in the detection method for a sound source according to the first embodiment or the like, but it is understood that both the values (averaged values) of the magnitudes of the waveform segment corresponding to the source intensities of the sound intensities $I_x$ and $I_z$ in the x direction and the z direction have been successfully recognized as values (coordinates) of substantially zero.

As a result, as illustrated as the partial results in the right part of FIG. 10, the position (black circle) of the sound source $S_1$ detected (estimated) at this time is estimated in a place that substantially agrees with the correct position (white circle) of the sound source $S_1$ supposed to be located on the y-axis. That is, even with this detection method, in the same manner as in the case of the detection method for a sound source according to the first embodiment or the like, it is understood that the position of the sound source $S_1$ has been estimated on the y-axis with high accuracy.

Therefore, also with this detection method and the detection device 1B therefor, it is possible to accurately detect the position of a sound source.

Detection Result 2 of Sound Source Position

Figure 11:
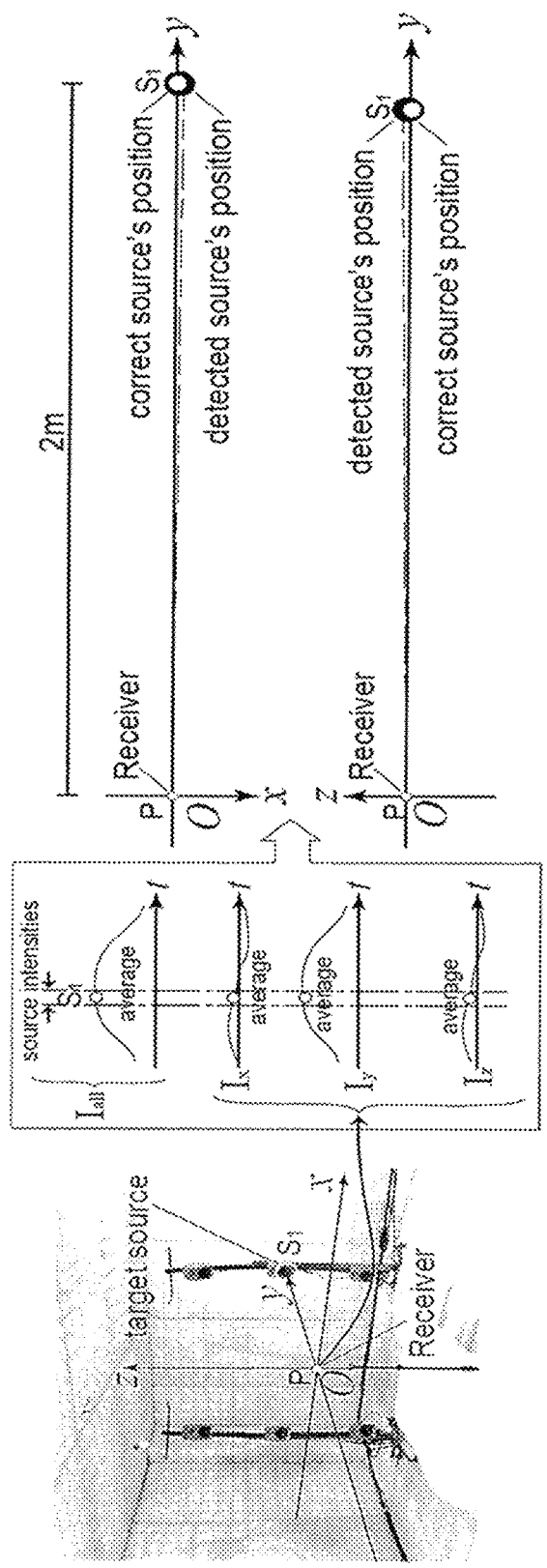
FIG. 11 is an explanatory diagram for illustrating a configuration example of the sound field in the detection method illustrated in FIG. 7 or other such method and an example of the results obtained by the detection method (when a spatial travel speed of a sound particle velocity is employed).

For reference, FIG. 11 is an illustration of an example of results obtained when the coordinates of the sound source are estimated by the second estimation means 4B for sound source coordinates or in the second estimation step performed thereby after cutting out the source intensity component from the sound intensity of the total value $I_{all}$ based on the comparison between the spatial travel speed of the total value $U_{all}$ of the sound particle velocities and the threshold value Vs in the second extraction means 3B for a sound source or in the second extraction step performed thereby. At this time, the measurement is performed under the same conditions as those used at the time of the above-mentioned measurement of sound intensities.

Even in the case of thus detecting the sound source position after cutting out the source intensity component from the sound intensity of the total value $I_{all}$ by referring to the total value $U_{all}$ of the sound particle velocities, as is apparent from the partial results illustrated in the right part of FIG. 11, the sound source position is estimated in a place that substantially agrees with the correct position (white circle) of the sound source $S_1$ supposed to be located on the y-axis, and it is thereby understood that the position of the sound source $S_1$ has been estimated on the y-axis with high accuracy.

Therefore, even in the case of using not only the spatial travel speed of a sound intensity but also the spatial travel speed of a sound particle velocity, the detection method for a sound source and the detection device 1B therefor according to the second embodiment enable the position of a sound source to be accurately detected.

In addition, as is apparent from the results illustrated in FIG. 5, FIG. 10, and FIG. 11, the detection method for a sound source (detection device 1B therefor) according to the second embodiment can be referred to as a useful method (or means) for accurately detecting the position of a sound source as well as the detection method for a sound source according to the first embodiment (detection device 1A therefor).

Meanwhile, the detection method (detection device 1B therefor) according to the second embodiment further includes the following merits (e1) and (e2), which are described below, because the detection method according to the second embodiment does not involve referring to amplitude information on sound intensity waveforms, and is considered as a method (or means) more compatible with sound intensity waveforms in principle than the detection method for a sound source according to the first embodiment (detection device 1A therefor), which involves referring to the amplitude information.

In consideration of this point, the detection method (detection device 1B therefor) according to the second embodiment enables the position of a sound source to be more accurately detected through use of the measurement results of the sound intensities than the detection method according to the first embodiment (detection device 1A therefor).

(e1) The detection method for a sound source (detection device 1B therefor) according to the second embodiment involves referring to speed information on the waveforms of the sound intensities instead of the amplitude information, and therefore enables the position of a sound source to be estimated from a sound field in which, for example, the sound source is present at the position of the sound receiving point P (origin) or its near position and the amplitudes of the waveforms of the sound intensities of the sound source have values of substantially zero or have disturbed amplitude characteristics including a large number of measurement errors.

(e2) The detection method for a sound source (detection device 1B therefor) according to the second embodiment involves referring to the speed information on the waveforms of the sound intensities instead of the amplitude information, and therefore enables the position of a sound source to be estimated from the sound intensities having disturbed amplitude characteristics, which are measured in a sound field under an environment exhibiting much noise.

Comparative Test Regarding Merit (e1)

Figure 12:
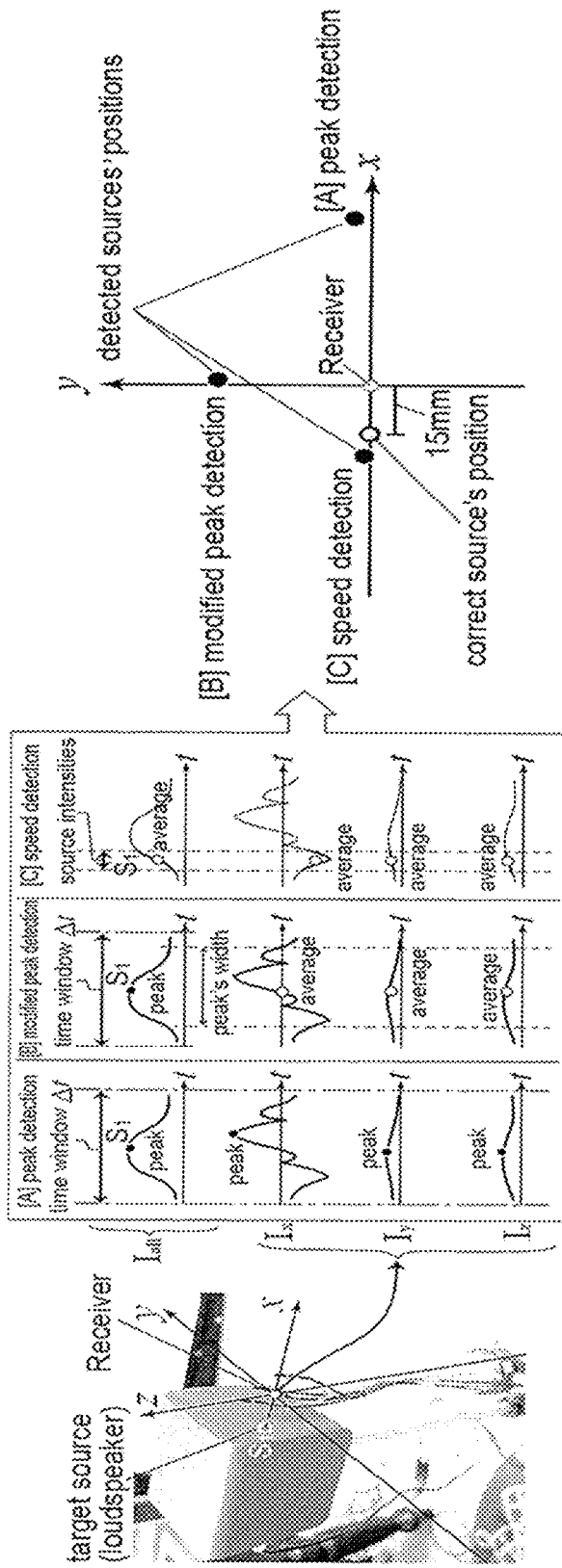
FIG. 12 is an explanatory diagram for illustrating conditions for a comparative test regarding a merit (e1) and results thereof.

FIG. 12 is an illustration of details of a test and its results performed and obtained when the estimation of the position of the real source $S_1$ installed at the near position (x=−15 (mm), y=0, z=0) to the sound receiving point (origin) was performed.

A sound field in which the test was performed was a living room having such a size that the dimensions in the x, y, and z directions are 2.7 m, 4.5 m, and 2.5 m, respectively, and was a closed space in which the resonance and reflection of sound occur as in a typical room.

Then, the microphones 6 (omnidirectional microphones 6a to 6d) having the configuration referred to in the description on the measurement of sound intensities in the first embodiment were installed at the substantially center position in this closed space, and as illustrated in the left part of FIG. 12, the three orthogonal axial directions (x, y, and z) were set with the position of one microphone (6a in FIG. 4) corresponding to the origin being set as the sound receiving point (P).

As the sound source $S_1$ being the target to be estimated, a loudspeaker was used. The loudspeaker of the sound source $S_1$ was installed so that the front central part of the loudspeaker (indicated by the white circle "○") was present at the above-mentioned near position. The test was performed by calculating impulse responses from sound pressure waveforms obtained by playing back a frequency sweep sound (sweep sine wave) from the loudspeaker of the sound source $S_1$ and recording the frequency sweep sound by the microphones 6 (omnidirectional microphones 6a to 6d).

Under those conditions, the test was performed by each of the detection method 4 using the "peak detection", the detection method according to the first embodiment using the "modified peak detection", and the detection method according to the second embodiment using the "speed detection", which are described above, for comparison.

The results of the comparative test are illustrated in the central part and the right part of FIG. 12.

In FIG. 12, [A] indicates the results of the detection method 4 using the "peak detection", [B] indicates the results of the detection method according to the first embodiment using the "modified peak detection", and [C] indicates the results of the detection method according to the second embodiment using the "speed detection". The same symbols [A], [B], and [C] apply to the results of comparative tests described later.

Firstly, an examination is made of the sound intensities $I_y$ and $I_z$ indicating the sound source information from the position of y=0 and z=0. In this respect, the sound intensities $I_y$ and $I_z$ are supposed to theoretically have a value of zero, but in the actual measurement, as illustrated in the central part of FIG. 12, the result of exhibiting a waveform having a slight peak was obtained in any one of the cases of [A], [B], and [C].

This indicates that, in any one of the cases, the peak value was obtained in the waveform of the sound intensity of the total value $I_{all}$ used for examining the presence of a sound source, and hence it is understood that the coordinates of the sound source were successfully recognized not only by the detection method according to the second embodiment using the "speed detection" but also even by the detection method 4 using the "peak detection" and the detection method according to the first embodiment using the "modified peak detection".

It is conceivable that this is because the loudspeaker of the sound source $S_1$ had a size to some extent, and was therefore supplied with sound not only from a pinpoint of y=0 and z=0 but also from around the pinpoint, with the result that the position of the sound source was recognized as a place slightly deviating from y=0 and z=0.

However, when the loudspeaker of the sound source $S_1$ is set to a minimum sound source, any one of the measurement results of the sound intensities $I_y$ and $I_z$ becomes closer to a value of zero, and hence peak information on the waveforms cannot be obtained, and it is conceivable that it becomes difficult to estimate the position of the minimum sound source by the above-mentioned detection method using the "peak detection" or the "modified peak detection".

Secondly, an examination is made of the sound intensity $I_x$ indicating the sound source information from x=−15 (mm), which is a near position to x=0. In this respect, the waveform of the sound intensity $I_x$ is theoretically supposed to have a slightly negative peak, but in the actual measurement, as illustrated in the central part of FIG. 12, the result of exhibiting a disturbed waveform including a large number of measurement errors exhibited not only on the negative side but also on the positive side was obtained in any one of the cases of [A], [B], and [C].

From the above, the final estimation results of the position of the sound source $S_1$ were obtained as such results as illustrated in the right part of FIG. 12.

First, in the case [A] of the detection method 4 using the "peak detection", the correct coordinate position of the sound source $S_1$ in the x direction is correctly supposed to have a value on the negative side, but the estimation result indicates that the coordinate position in the x direction was erroneously recognized as having a positive value being an error component. It is conceivable that this was caused as a result of detecting a peak on the positive side as the coordinates of the sound source information due to the largest peak in the measured waveform of the sound intensity $I_x$ appearing on the positive side.

In the case [B] of the detection method according to the first embodiment using the "modified peak detection", the error component was alleviated by averaging processing for the magnitudes within the peak width, but the estimation result indicates that the alleviation was not enough to recognize the coordinate position in the x direction as having a negative value. It is conceivable that this was caused as a result of failing to bring the coordinate position in the x direction back enough toward the negative direction while the correct component on the negative side within the peak width of the waveform of the sound intensity $I_x$ was canceled by the error component on the positive side through the averaging processing.

Meanwhile, in the case [C] of the detection method according to the second embodiment using the "speed detection", the estimation result indicates that the coordinate position in the x direction was recognized as a value on the negative side. It is conceivable that this was caused as a result of successfully cutting out only the negative component being the correct component in the waveform of the sound intensity $I_x$ in the x direction due to the fact that only the first waveform segment (segment corresponding to the source intensity) exhibiting a slow movement was cut out from the waveform of the sound intensity of the total value $I_{all}$ as the sound source information.

To summarize the above description, it is clear that, even in a sound field in which the sound source $S_1$ is present at a near position to the sound receiving point, only the detection method according to the second embodiment using the "speed detection" enables the presence of the sound source $S_1$ to be correctly detected and then enables the position of the sound source $S_1$ to be correctly estimated.

Comparative Test Regarding Merit (e2)

Figure 13:
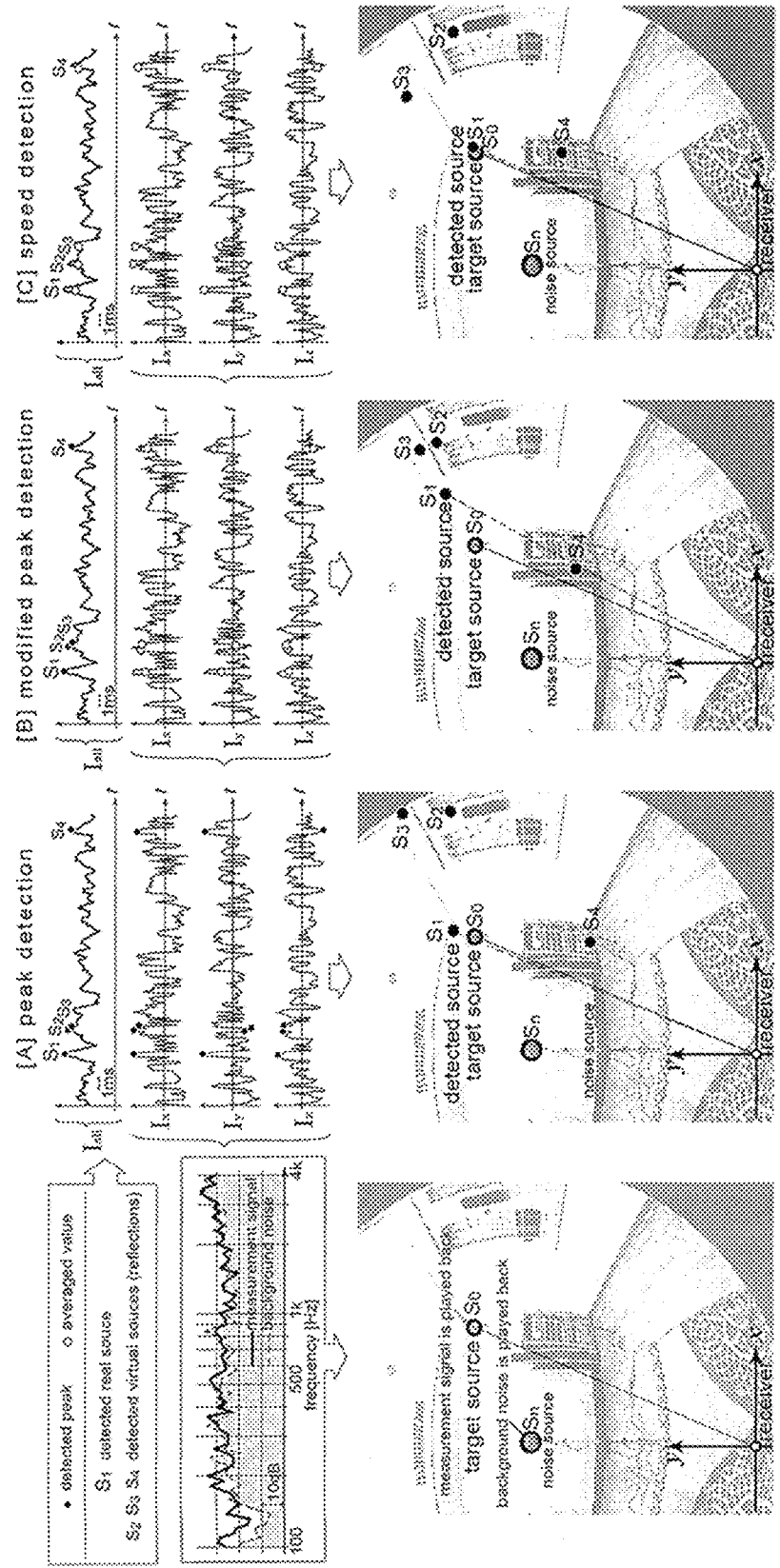
FIG. 13 is an explanatory diagram for illustrating conditions for a comparative test regarding a merit (e2) and results thereof.

FIG. 13 is an illustration of details of a test and its results performed and obtained when the estimation of the position of a sound source in a sound field under an environment exhibiting much noise.

A sound field in which the test was performed was a living room (closed space) under the same conditions as the sound field used for the comparative test regarding the merit (e1). Then, the microphones 6 (omnidirectional microphones 6a to 6d) having the configuration referred to in the description on the measurement of sound intensities in the first embodiment were installed at the substantially center position in this closed space, and as illustrated in the left end part of FIG. 13, the three orthogonal axial directions (x, y, and z) were set with the position of one microphone (6a in FIG. 4) corresponding to the origin being set as the sound receiving point (P).

In the test, as the sound source $S_0$ being the target to be estimated, a loudspeaker serving as the real source was used. The loudspeaker of the sound source $S_0$ was installed at such a position that the front central part of the loudspeaker was spaced apart from the sound receiving point in the above-mentioned sound field by 1.58 m with an azimuth of 45° (angle formed clockwise with the frontward +y direction being set as 0°) and an elevation angle of 17.6° with respect to the sound receiving point. In the test, the same frequency sweep sound (sweep sine wave) as that used for the comparative test regarding the merit (e1) was played back from this loudspeaker.

In addition, in the test, a loudspeaker different from the sound source $S_0$ was used as a noise source $S_n$. The loudspeaker of the noise source $S_n$ was installed at such a position that the front central part of the loudspeaker was spaced apart from a position near the sound receiving point by 1.5 m with an azimuth of 0° (frontward +y direction) and an elevation angle of 0°. In the test, pink noise (noise having power inversely proportional to the frequency) was played back from the loudspeaker as wide band noise.

Then, the test was performed by recording sounds played back respectively from the loudspeaker of the real source $S_0$ and the loudspeaker of the noise source $S_n$ by the microphones 6 (omnidirectional microphones 6a to 6d) in the above-mentioned sound field and calculating impulse responses from sound pressure waveforms obtained through the recording. An analysis for the detection of the sound source position at this time was performed within a frequency range of from 100 Hz to 4 kHz.

Incidentally, the sound field at this time was under an environment exhibiting an SN ratio of substantially 0 (dB) at the time of the measurement of a playback sound from the real source $S_0$ and a playback sound from the noise source $S_n$ and including noise high enough to disable the playback sound from the real source $S_0$ from being aurally (audibly) recognized (see the frequency characteristics illustrated in the left end central part of FIG. 13).

Under those conditions, the test was performed by each of the detection method 4 using the "peak detection", the detection method according to the first embodiment using the "modified peak detection", and the detection method according to the second embodiment using the "speed detection", which are described above, for comparison.

The results of this comparative test are illustrated in the right part of FIG. 13 excluding the left end part thereof.

First, in anyone of the cases of the above-mentioned detection methods ([A], [B], and [C]), the results indicate that the sound intensities $I_x$, $I_y$, and $I_z$ in the three axial directions exhibit waveforms having as greatly disturbed amplitude characteristics as to make the discrimination of peaks difficult.

However, the disturbance of the amplitude of the waveform of the sound intensity of the total value $I_{all}$ due to the noise was alleviated to some degree, and hence the presence of a sound source itself was successfully recognized in any one of the cases of the above-mentioned detection methods ([A], [B], and [C]). However, the results indicate that the estimated coordinates of the sound source are different between the respective detection methods as illustrated in the lower right part FIG. 13 excluding the left end part thereof.

That is, in the case [A] of the detection method 4 using the "peak detection" and the case [B] of the detection method according to the first embodiment using the "modified peak detection", the results indicate that the estimated coordinate position of the sound source $S_1$ deviates from the correct position of the real source $S_0$ being the target to be estimated. Meanwhile, in the case [C] of the detection method according to the second embodiment using the "speed detection", the result indicates that the estimated coordinate position of the sound source $S_1$ substantially agrees with the correct position of the real source $S_0$.

Therefore, it is understood that the detection method according to the second embodiment using the "speed detection" enables the position of the real source $S_0$ to be estimated with the highest accuracy.

From the above, it is clear that, even in the sound field under the environment exhibiting much noise, the detection method according to the second embodiment using the "speed detection" enables the presence of the sound source $S_0$ to be correctly detected and then enables the position of the sound source $S_0$ to be correctly estimated.

Incidentally, in the results of the comparative test illustrated in FIG. 13, the estimation is performed with higher accuracy in the case [A] of the detection method 4 using the "peak detection" than in the case [B] of the detection method according to the first embodiment using the "modified peak detection".

It is conceivable that this is because, in regard to the measured waveforms of the sound intensities $I_x$, $I_y$, and $I_z$ having greatly disturbed width characteristics, true sound source information is canceled by noise information with the detection method according to the first embodiment using the "modified peak detection", which uses the method of averaging the magnitudes within the peak width.

For this reason, with the detection method 4 using the "peak detection" and the detection method according to the first embodiment using the "modified peak detection", which use the amplitude information on the sound intensity waveform, the superiority or inferiority of the estimation result of the sound source position may be changed over depending on differences in noise in the sound field, measurement environment, and positional condition of the sound source.

Meanwhile, with the detection method according to the second embodiment using the "speed detection", the sound source position can be estimated with stable accuracy without depending on the differences in noise in the sound field, measurement environment, and positional condition of the sound source.

Comparative Test Serving as Reference

Figure 14:
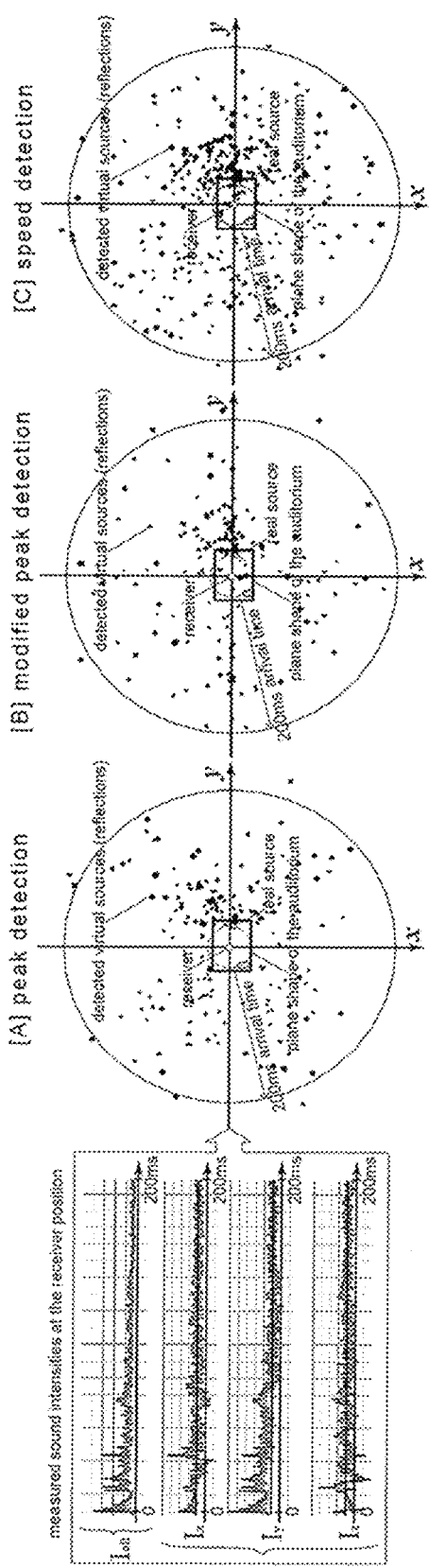
FIG. 14 is an explanatory diagram for illustrating results of a comparative test for reference.
Figure 15:
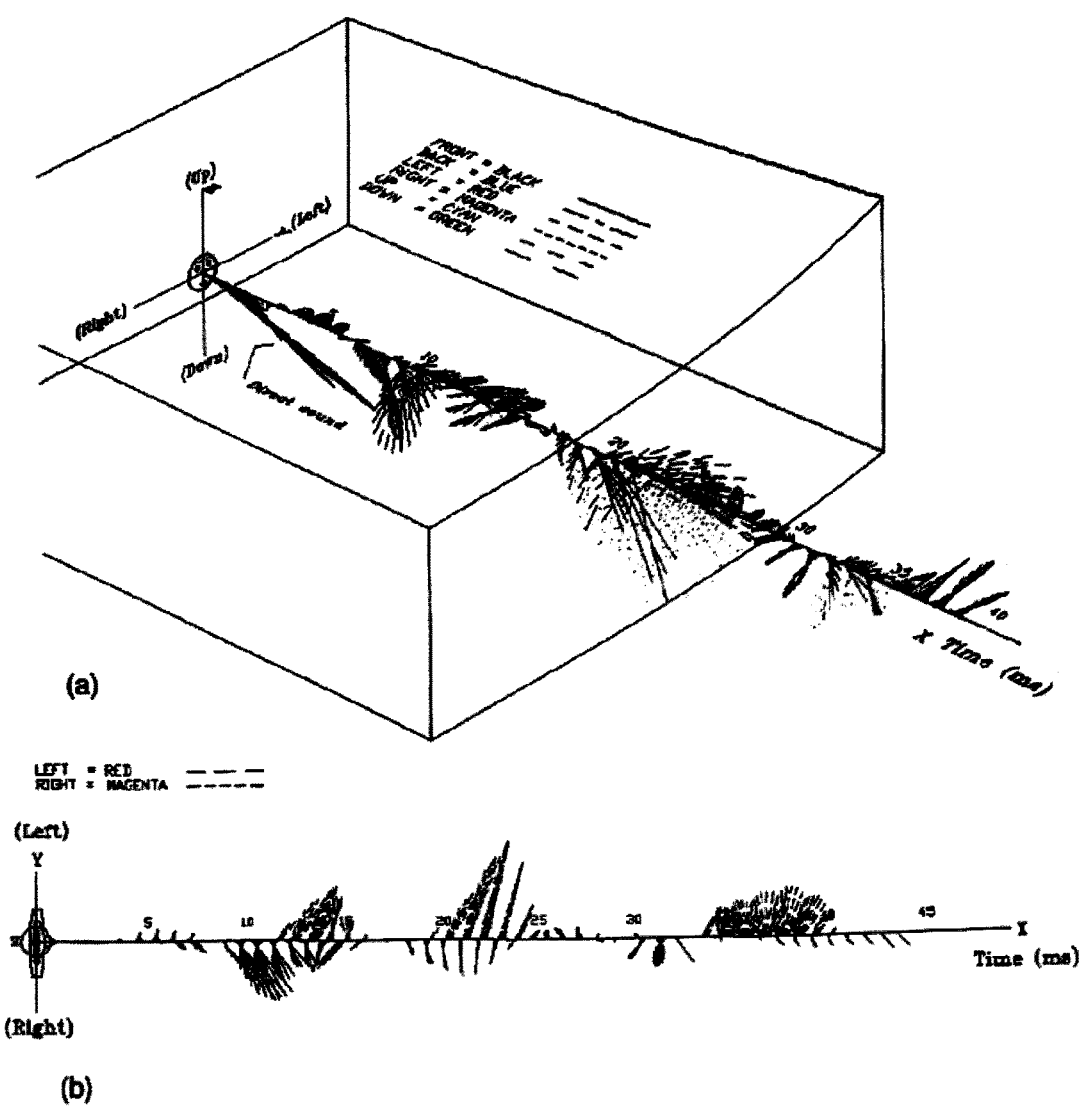
FIG. 15 is an explanatory diagram for illustrating a concept of a related-art sound analysis method 1 and an example of results obtained by the method 1.
Figure 16:
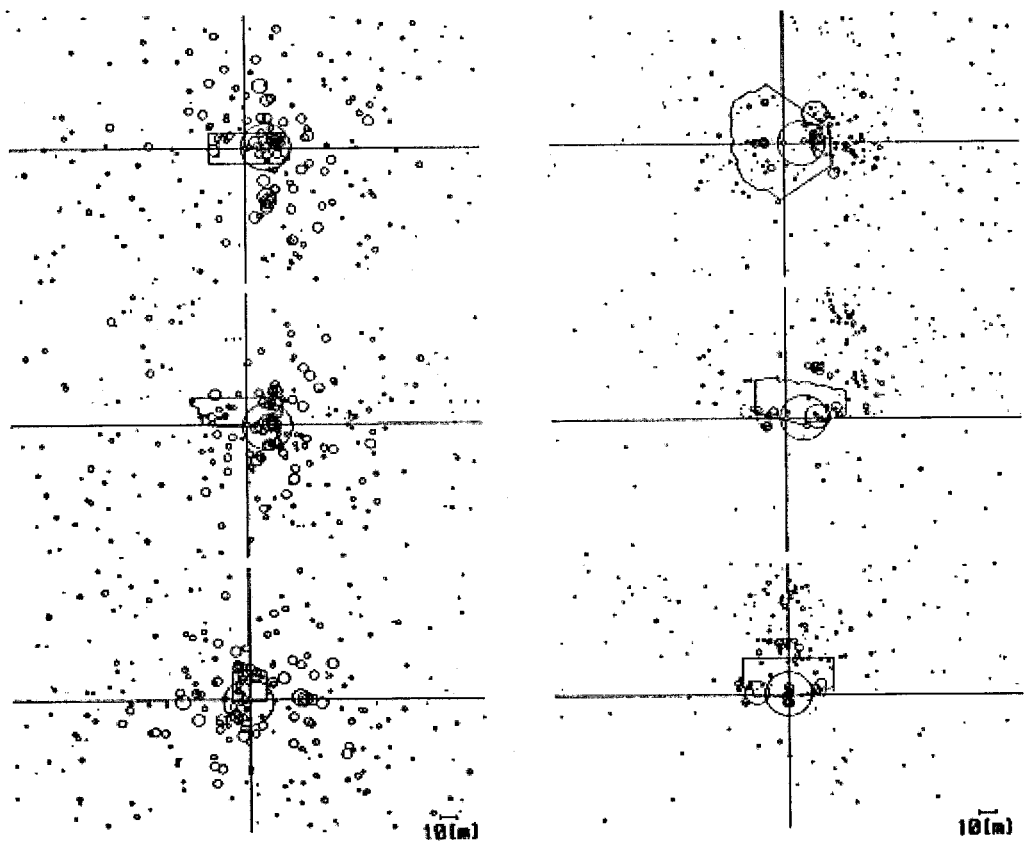
FIG. 16 is an explanatory diagram for illustrating an example of results obtained by a related-art sound analysis method 2.
Figure 17:
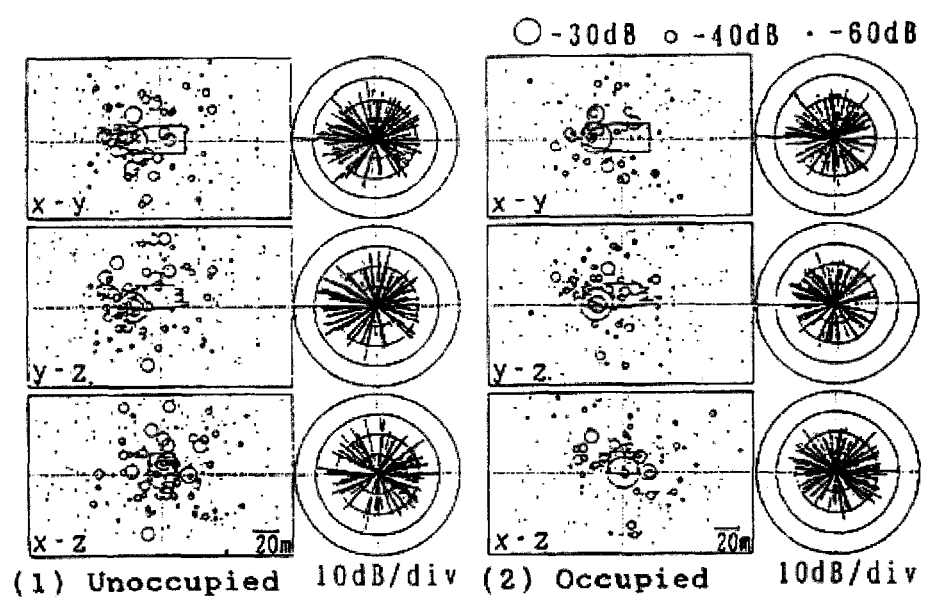
FIG. 17 is an explanatory diagram for illustrating an example of results obtained by a related-art sound analysis method 3.
Figure 18:
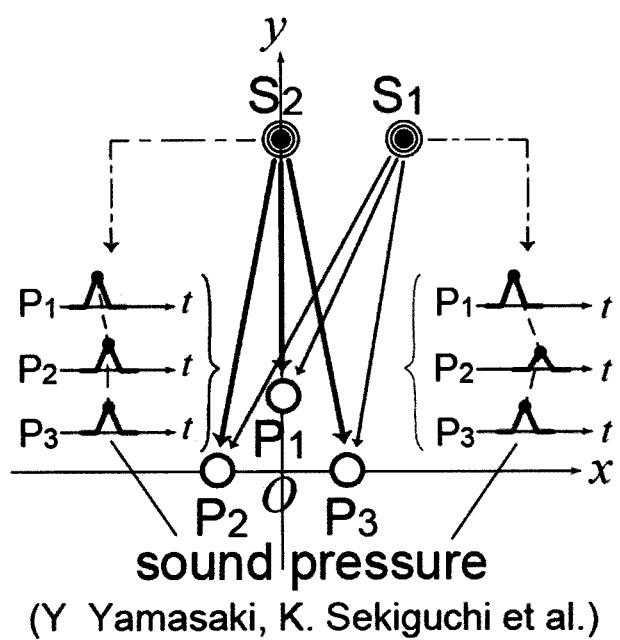
FIG. 18 is an explanatory diagram for illustrating a part of a basic idea of sound source extraction of the sound analysis methods 2 and 3.
Figure 19:
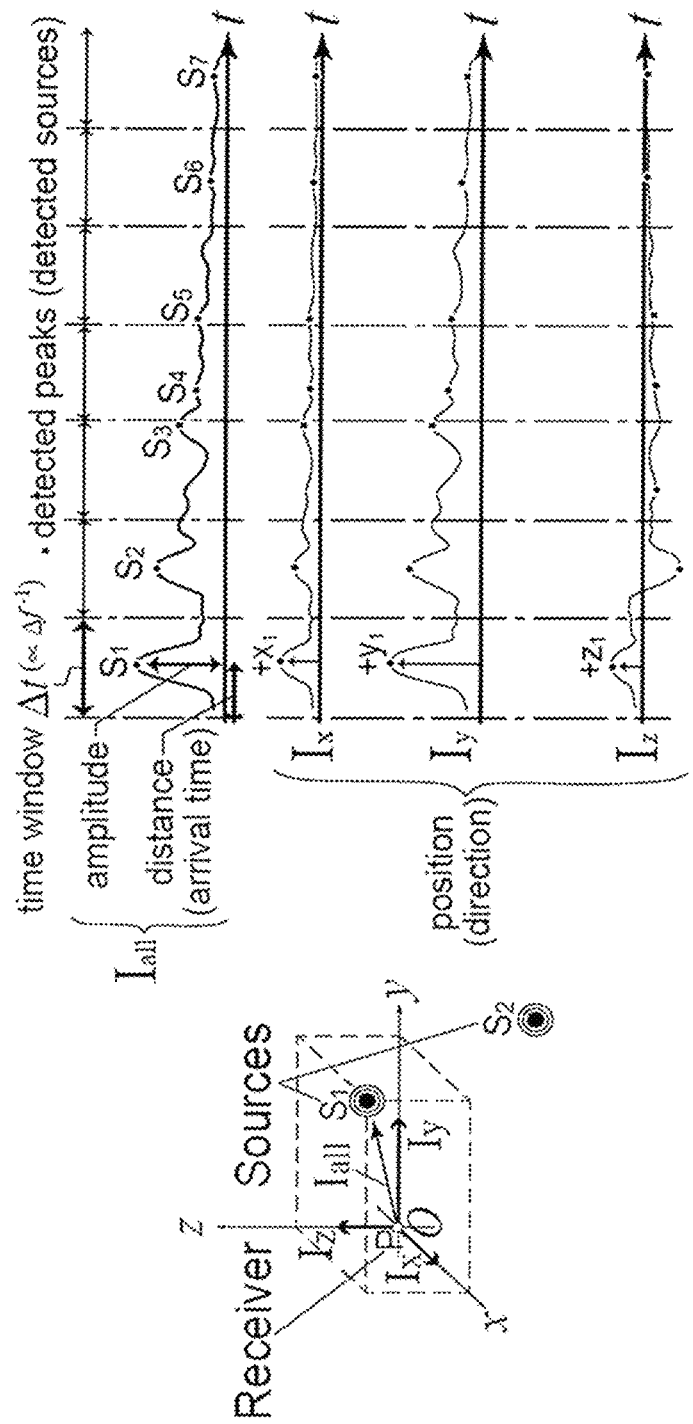
FIG. 19 is an explanatory diagram for illustrating a concept of a method 4 of detecting sound source information from sound intensities through use of peak detection and an example of results obtained in one process thereof.

FIG. 14 is an illustration of results of a comparative test performed for reference when the positions of sound sources were estimated by the detection method 4 using the "peak detection", the detection method according to the first embodiment using the "modified peak detection", and the detection method according to the second embodiment using the "speed detection" in regard to the distribution of reflections, namely, virtual sources in a concert hall.

In this test, from an omnidirectional loudspeaker (real source) installed on a stage in a concert hall, a frequency sweep sound (sweep sine wave) was played back, impulse responses directed from the real source to a sound receiving point installed in an auditorium were measured, and the sound intensities in the three axial directions were calculated by the above-mentioned P-P method. Then, the positions of the sound sources (virtual sources) were estimated by each of the above-mentioned detection methods through use of the measurement results of the sound intensities (results illustrated in the left end part of FIG. 14) in the same manner. The estimated positions of the plurality of sound sources are illustrated together inside and outside a circular shape on each x-y plane in the right part of FIG. 14 excluding the left end part thereof.

From the results illustrated in FIG. 14, it is understood that, with the above-mentioned three detection methods for a sound source, distribution results exhibiting greatly different looks as the distribution of the virtual sources are obtained. This means that, when a different detection method for a sound source is used, even the same concert hall is evaluated as a space having a different resonance. Of those, in the case [C] of the detection method according to the second embodiment using the "speed detection", the positions of the largest number of virtual sources were successfully estimated.

From the above description, it is understood that it is important to selectively employ a highly accurate detection method for a sound source when a spatial sound analysis is performed. From such a point of view, it can be considered that the sound source position can be detected with the highest accuracy in the case of the detection method according to the second embodiment using the "speed detection" among the above-mentioned three detection methods.

Other Embodiments

In the first embodiment and the like, the example of the P-P method is illustrated as the measurement method for sound intensities, but as the measurement method, for example, the following method may be employed as well.

For example, another P-P method of performing the measurement through use of an omnidirectional microphone may be employed. That is, examples thereof include: a method of performing the measurement by arranging four omnidirectional microphones at the vertices of a regular tetrahedron, and a device therefor (MI-331 manufactured by Ono Sokki Co., Ltd.); and a method of performing the measurement through use of a total of six omnidirectional microphones by arranging microphone pairs in the three orthogonal axes, the microphone pairs each being formed of two microphones facing each other, and a device therefor (for example, SI-33I manufactured by RION Co., Ltd. or 50VI-1 manufactured by GRAS Sound & Vibration A/S).

In addition, a C-C method of performing the measurement through use of a unidirectional microphone may be employed (see, for example, Japanese Patent Application Laid-open No. 2008-249702). When this C-C method is employed, a sound pressure is calculated based on a sum of outputs from two microphones facing each other, a sound particle velocity is calculated based on a difference between those outputs, and then a sound intensity is obtained by multiplying the multiplication of the calculated sound pressure by the calculated sound particle velocity.

There is also a method of obtaining a sound intensity by directly measuring a particle speed. When this method is employed, a sound intensity can be obtained by multiplying a sound pressure and a sound particle velocity that are obtained from a PU sensor (USP manufactured by Microflown Technologies BV) formed of a combination of a microphone and a sound particle velocity sensor. With the P-P method and the C-C method, a sound intensity can be obtained through use of a sound particle velocity approximately calculated from a sound pressure obtained by a microphone.

REFERENCE SIGNS LIST 1A, 1B . . . detection device for a sound source
2 . . . measurement means for sound intensity
3A . . . first extraction means for a sound source
3B . . . second extraction means for a sound source
4A . . . first estimation means for sound source coordinates
4B . . . second estimation means for sound source coordinates
$I_x$, $I_y$, $I_z$ . . . sound intensities in three axial directions orthogonal to each other $I_{all}$ ... total value of sound intensities $U_x$, $U_y$, $U_z$ ... sound particle velocities in the three axial directions orthogonal to each other $U_{all}$ ... total value of sound particle velocities

The invention claimed is:

1. A detection method for a sound source, comprising:
measuring sound intensities $I_x$, $I_y$, and $I_z$ (W/m$^2$) in three axial directions (x, y, and z) orthogonal to each other at a sound receiving point in a sound field, and calculating a total value of the sound intensities $I_x$, $I_y$, and $I_z$ as $I_{all}=\sqrt{(I_x^2+I_y^2+I_z^2)}$ (where $\sqrt{( )}$ represents a square root of a value in parentheses);
extracting a peak in a sound intensity waveform of the total value that is obtained for each time window where the peak indicates the sound source, and calculating a level of the sound source and a distance from the sound source from the extracted peak; and
estimating a peak width of the total value that is obtained, calculating signed averaged values of magnitudes of the sound intensities $I_x$, $I_y$, and $I_z$ around given peaks $P_x$, $P_y$, and $P_z$ within peak widths $W_x$, $W_y$, and $W_z$ corresponding to the peak width of the total value $I_{all}$, and estimating coordinates of the sound source from the signed averaged values within the peak widths in the sound intensities $I_x$, $I_y$, and $I_z$ and the distance from the sound source that is obtained.

2. A detection method for a sound source, comprising:
measuring sound intensities $I_x$, $I_y$, and $I_z$ (W/m$^2$) in three axial directions (x, y, and z) orthogonal to each other at a sound receiving point in a sound field, and calculating a total value of the sound intensities $I_x$, $I_y$, and $I_z$ as $I_{all}=\sqrt{((I_x^2+I_y^2+I_z)}$ (where $\sqrt{( )}$ represents a square root of a value in parentheses);
setting a threshold value of a spatial travel speed for distinguishing a sound intensity of the total value that is obtained between a source intensity component and a drifting intensity component;
cutting out, from the sound intensity of the total value, source intensity component exhibiting a spatial travel speed equal to or lower than the threshold value, or cutting out, from the sound intensity of the total value, source intensity component corresponding to an arrival time of a sound particle velocity exhibiting a spatial travel speed equal to or lower than the threshold value based on a total value of sound particle velocities obtained by dividing the sound intensity of the total value by a sound pressure;
calculating averaged values of a strength and an arrival time of the cut-out source intensity component exhibiting the spatial travel speed equal to or lower than the threshold value, or the source intensity component corresponding to the arrival time of the sound particle velocity exhibiting the spatial travel speed equal to or lower than the threshold value as a piece to set a level of the sound source and a distance from the sound source; and
cutting out the sound intensities $I_x$, $I_y$, and $I_z$ included in the same time width as the piece being the source intensity component that is cut out, calculating averaged values of signed magnitudes of the cut-out sound intensities $I_x$, $I_y$, and $I_z$, and estimating coordinates of the sound source from signed averaged values of the sound intensities $I_x$, $I_y$, and $I_z$ and the distance from the sound source that is obtained.

3. A detection device for a sound source, comprising:
processing circuitry configured to:
measure sound intensities $I_x$, $I_y$, and $I_z$ (W/m$^2$) in three axial directions (x, y, and z) orthogonal to each other at a sound receiving point in a sound field, and calculate a total value of the sound intensities $I_x$, $I_y$, and $I_z$ as Ian=$\sqrt{(I_x^2+I_y^2+I_z^2)}$ (where $\sqrt{( )}$ represents a square root of a value in parentheses);
extract a peak in a sound intensity waveform of the total value that is obtained for each time window where the peak indicates the sound source, and calculate a level of the sound source and a distance from the sound source from the extracted peak; and
estimate a peak width of the total value that is obtained, calculate signed averaged values of magnitudes of the sound intensities $I_x$, $I_y$, and $I_z$ around given peaks $P_x$, $P_y$, and $P_z$ within peak widths $W_x$, $W_y$, and $W_z$ corresponding to the peak width of the total value $I_{all}$, and estimate coordinates of the sound source from the signed averaged values within the peak widths in the sound intensities $h_x$, $I_y$, and $I_z$ and the distance from the sound source that is obtained.

4. A detection device for a sound source, comprising:
processing circuitry configured to:
measure sound intensities $I_x$, $I_y$, and $I_z$ (W/m$^2$) in three axial directions (x, y, and z) orthogonal to each other at a sound receiving point in a sound field, and calculate a total value of the sound intensities $I_x$, $I_y$, and $I_z$ as $I_{all}=\sqrt{(I_x^2+I_y^2+I_z^2)}$ (where $\sqrt{( )}$ represents a square root of a value in parentheses);
set a threshold value of a spatial travel speed for distinguishing a sound intensity of the total value obtained in the measurement step between a source intensity component and a drifting intensity component;
cut out, from the sound intensity of the total value, source intensity component exhibiting a spatial travel speed equal to or lower than the threshold value, or cut out, from the sound intensity of the total value, source intensity component corresponding to an arrival time of a sound particle velocity exhibiting a spatial travel speed equal to or lower than the threshold value based on a total value of sound particle velocities obtained by dividing the sound intensity of the total value by a sound pressure;
calculate averaged values of a strength and an arrival time of the cut-out source intensity component exhibiting the spatial travel speed equal to or lower than the threshold value, or source intensity component corresponding to the arrival time of the sound particle velocity exhibiting the spatial travel speed equal to or lower than the threshold value as a piece to set a level of the sound source and a distance from the sound source; and
cut out the sound intensities $I_x$, $I_y$, and $I_z$ included in the same time width as the piece being the source intensity component that is cut out, calculating averaged values of signed magnitudes of the cut-out sound intensities $I_x$, $I_y$, and $I_z$, around given peaks $P_x$, $P_y$, and $P_z$ within peak widths $W_x$, $W_y$, and $W_z$ corresponding to the peak width of the total value Ian and estimate coordinates of the sound source from signed averaged values of the sound intensities $h_x$, $h_y$, and $h_z$ and the distance from the sound source that is obtained.

* * * * *